(12) United States Patent
Yashima et al.

(10) Patent No.: US 6,275,878 B1
(45) Date of Patent: Aug. 14, 2001

(54) DATA RECORDER AND DATA PRODUCING CIRCUIT

(75) Inventors: Noboru Yashima; Kazuhiro Sugiyama; Shigeru Matsui; Yukari Hiratsuka; Naoki Kizu, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/239,994

(22) Filed: Jan. 29, 1999

(30) Foreign Application Priority Data

Jan. 30, 1998 (JP) .................................................. 10-019295

(51) Int. Cl.⁷ .............................. G06F 3/06; G11B 20/10
(52) U.S. Cl. .................................. 710/61; 710/65; 369/59
(58) Field of Search .......................... 360/46–62; 369/59; 386/124–126, 119, 109; 710/5–7, 33–35, 58–61, 65–71, 129–130

(56) References Cited

U.S. PATENT DOCUMENTS

| | | | |
|---|---|---|---|
| 4,734,901 | * 3/1988 | Murakami | 369/59 |
| 5,581,715 | 12/1996 | Verinsky et al. | 700/1 |
| 5,642,460 | * 6/1997 | Shimoda | 386/124 |
| 5,659,529 | 8/1997 | Maeda et al. | 369/59.25 |
| 5,917,792 | * 6/1999 | Shigenobu et al. | 369/59 |
| 5,923,813 | * 7/1999 | Okamoto et al. | 386/109 |
| 6,047,398 | * 4/2000 | Okayama et al. | 714/764 |
| 6,115,198 | * 9/2000 | Reed et al. | 360/46 |
| 6,192,499 | * 2/2001 | Yang | 714/785 |

FOREIGN PATENT DOCUMENTS

| | | | |
|---|---|---|---|
| 0 544 504 A2 | 11/1992 | (EP) | . |
| 0 726 571 A1 | 8/1996 | (EP) | . |
| 0 798 716 A2 | 10/1997 | (EP) | . |
| 0 820 063 A2 | 1/1998 | (EP) | . |
| 0 837 472 A2 | 4/1998 | (EP) | . |
| 0933767 | * 4/1999 | (EP) | G11B/20/10 |
| 411219261 | * 8/1999 | (JP) | G06F/3/06 |

\* cited by examiner

*Primary Examiner*—Christopher B. Shin
(74) *Attorney, Agent, or Firm*—Birch, Stewart, Kolasch & Birch, LLP

(57) ABSTRACT

A data recorder for recording data onto a record medium on which a sync signal is inserted at a given interval, has a sequence controller, wherein, after receiving the command from the system controller which triggers an initiation of a recording operation, the sequence controller activates the first encoder in response to a leading end signal of the encoded block from the sync signal set-up section, activates the first encoder and the second encoder in response to a leading end signal of the next encoded block, and activates the first encoder, the second encoder and the data reader in response to a leading end signal of the next following encoded block, and wherein, during the absence of the command from the system controller which triggers an initiation of a recording operation, the sequence controller deactivates the first encoder in response to a leading end signal of an encoded block from the sync signal set-up section, deactivates the first encoder and the second encoder in response to a leading end signal of the next encoded block, and deactivates the first encoder, the second encoder and the data reader in response to a leading end signal of the next following encoded block.

12 Claims, 14 Drawing Sheets

DATA RECORDER AND DATA PRODUCING CIRCUIT

BACKGROUND OF THE INVENTION

The present invention relates to a data recorder for use in an apparatus which writes data into a record medium such as a DVD-RAM, and a data producing circuit incorporated into the data recorder.

A conventional data recorder will be described with reference to FIG. 14. The conventional data recorder includes a microcomputer 1 for controlling the system, a first encoder 3 for applying a first encoding processing operation to input data 2 which is to be recorded onto a record medium 24 for temporary storage in a memory 10 and being activated by a first activation signal 4, a second encoder 11 for reading first data 7 which is temporarily stored in the memory 10, applying a second encoding processing operation to the data before it is temporarily stored again in the memory 10, and being activated by a second activation signal 12, and a data reader 16 which sends data 20 read out from the memory 10 to a data transducer 23. A first enable signal 5 is used in switching a region in the memory 10 which is accessed by the first encoder 3. The first data 7 from the first encoder 3 is stored in a region in the memory 10 which is specified by a first address 6. A region in the memory 10 which is accessed is specified by a selection address 8, and a read/write operation of selected data 9 is performed in the region. A second enable signal 13 switches a region within the memory 10 as it is accessed by the second encoder 11. Data from the second encoder 11 is stored in the memory 10 in a region specified by a second address 14. The second data 15 is transferred between the memory 10 and the second encoder 11 as a result of read/write operation.

A region in the memory 10 is switched by a third enable signal 18 as it is accessed by the data reader 16, and third data 20 is read out by the data reader 16 from a memory region specified by a third address 19. The data reader 16 provides data output 21, which is written into a record medium 24 by a data transducer 23. The microcomputer 1 sends an encoding initiate signal 22 to a sync signal set-up section 29 and to a first encoding activation section 30. In response to the initiate signal 22 which is input from the microcomputer 1, the sync signal set-up section 29 produces a second sync signal 26 which has a period that is sixteen times the period of a first sync signal 25 and which is synchronized with the first sync signal 25. The first sync signal 25 is produced by a sync detector 27 when it has detected sector information from the record medium 24.

The microcomputer 1 also sends an initialize signal 28 which initializes a region in the memory 10 as the first encoder 3, the second encoder 11 and the data reader 16 accesses the region in the memory 10. The first encoding activation section 30 produces a first activation signal 4 and a first enable signal 5 when the encoding initiate signal 22 and the second sync signal are input thereto. A second encoding activation section 32 produces a second activation signal 12 and a second enable signal 13 when an end of the first encoding signal 31 is input thereto.

The first encoder 3 is activated when the first activation signal 4 and the second sync signal 26 are input thereto. A block in the memory 10 which is accessed is changed to a next block when the first enable signal 5 and the second sync signal 26 are input. Similarly, the second encoder 11 is activated when the second activation signal 12 and the second sync signal 26 are input thereto, and a block in the memory 10 which is accessed is changed to a next block when the second enable signal 13 and the second sync signal 26 are input. A block in the memory 10 which is accessed by the data reader 16 is also changed to a next block when the third enable signal 18 and the second sync signal 26 are input.

FIG. 13 shows a data structure written into the record medium 24. FIG. 15 shows a logical construction of the overall record medium 24 including a lead-in area 31, representing a leader portion of a record medium structure 30, a data area 32 where data is recorded, and a lead-out area 33, which represents a last portion of the structure. The data area 32 comprises a plurality of sectors, and sixteen sectors define one block.

FIG. 16 shows a physical construction of the record medium 24. The first sync signal 25 is produced at a period of a sector while the second sync signal 26 is produced at a period of a block. A sector address is recorded in the leading end of each sector.

FIG. 17 shows a correspondence between the memory 10 and the data structure of the record medium 24. One block in the memory 10 comprises an amount of data corresponding to sixteen sectors. It is to be noted that data is treated in block unit on the memory 10, but is written into the record medium 24 in sector unit.

Next, the operation of the conventional data recorder will be described. Referring to the figures, the microcomputer 1 outputs the initialize signal 28 so that a region in the memory 10 which is accessed by the first encoder 3, the second encoder 11 and the data reader 16 is defined as a block #0. A signal from the record medium 24 causes the sync detector 27 to produce the first sync signal 25. The sync signal set-up section 29 produces the second sync signal 26 in synchronism with the first sync signal 25 wherever the encoding initiate signal 22 is input from the microcomputer 1. The second sync signal 26 represents a leading end of a block which is dealt with in the first and the second encoding operation.

The first encoding activation section 30 outputs the first activation signal 4 which activates the first encoder 3 after the encoding initiate signal 22 has defined the leading end of a block. In response to the first activation signal 4 and the second sync signal 26, the first encoder 3 executes an encoding processing of the input data 2 for respective sixteen sectors, and outputs the first address 6 and the first data 7, which results from the encoding processing of input data, for temporary storage of the data in the memory 10. The first address 6 and the first data 7 are transferred through an address bus and a data bus, respectively, in the form of the selection address 8 and the selected data 9, whereby the selected data is temporarily stored in the memory 10 at an address accessed by the selection address. Subsequently, the first encoding activation section 30 delivers the first enable signal 5 to change a region to be written from the first encoder to the next block #1.

The first encoder 3 then delivers the end of a first encoding signal 31 to the second encoding activation section 32, which responds thereto by sending the second activation signal 12 which activates the second encoder 11. The second encoder 11 accesses, by way of the second address 14, the block #0 which is selected by the first encoder 3 for temporary storage, reading it out as the second data 15. A second encoding is applied to the data thus read out for respective blocks, and the data is then again written into the block #0 in the memory 10. The second encoding activation section 32 then delivers the second enable signal 13, which changes a second point of encoding to the block #1.

The microcomputer 1 now delivers a third activation signal 17, whereupon the data reader 16 delivers the third address 19, which is used to access the memory 10 to read out the data in the block #0 which is written into by the second encoder 11 as third data 20. The third data 20 is read out and output on sector basis. The third data 20 on sector basis is transferred as a data output 21 from the data reader 16 to the data transducer 23, which transduces it into a signal form to be recorded on the record medium 24. The data transducer 23 performs a recording on the record medium 24 on sector basis. Upon completion of data reading from the block #0, the microcomputer 1 delivers the third enable signal 18, thus changing a memory region from which a data reading by the data reader 16 takes place to the block #1.

A series of operations described above are executed at a period corresponding to each block. Whenever a next data block is input, the first and the second encoding processing and the data reading are repeated anew, thus recording it onto the record medium 24. The hardware is reset upon completion of the operation.

With the conventional data recorder as described above, in order to read out encoded data from the memory and to record it onto the record medium, the microcomputer which monitors the end of the encoding operation and the timing of recording encoded data onto the record medium must be capable of a high speed operation, which requires the provision of a high speed microcomputer which is expensive, disadvantageously resulting in an increased cost of the system.

The designation of the position on the record medium where the recording is initiated depends on the encoding initiate signal, and therefore, if it is desired to start the recording at an arbitrary position, the recording must be controlled in accordance with the timing of the encoding initiate signal. This timing is controlled by the microcomputer, presenting an increased load on the microcomputer.

SUMMARY OF THE INVENTION

It is therefore an object of the present invention to provide a data recorder and a data producing circuit which allow a load on a microcomputer to be reduced.

According to an aspect of the present invention, a data recorder for recording data onto a record medium on which a sync signal is inserted at a given interval, comprises: a sync detector for detecting the sync signal recorded on the record medium; a system controller for triggering an initiation of a recording operation; a sync signal set-up section for producing a leading end signal of an encoded block which is defined by a predetermined number of sectors on the basis of a result obtained by the sync detector in response to a command from the system controller; a memory for temporarily storing a result of an encoding processing operation; a first encoder for applying a first encoding processing operation upon input data which is to be recorded onto the record medium and for causing a result of the first encoding processing operation to be temporarily stored in the memory; a second encoder for applying a second encoding processing operation upon the result of the first encoding processing operation which is temporarily stored in the memory and for causing a result of the second encoding processing operation to be temporarily stored again in the memory; a data reader for reading out the result of the second encoding processing operation which is temporarily stored in the memory; a data transducer for transducing data which is read out by the data reader into a form which can be recorded onto the record medium; and a sequence controller; wherein, after receiving the command from the system controller which triggers an initiation of a recording operation, the sequence controller activates the first encoder in response to a leading end signal of the encoded block from the sync signal set-up section, activates the first encoder and the second encoder in response to a leading end signal of the next encoded block, and activates the first encoder, the second encoder and the data reader in response to a leading end signal of the next following encoded block; and wherein, during the absence of the command from the system controller which triggers an initiation of a recording operation, the sequence controller deactivates the first encoder in response to a leading end signal of an encoded block from the sync signal set-up section, deactivates the first encoder and the second encoder in response to a leading end signal of the next encoded block, and deactivates the first encoder, the second encoder and the data reader in response to a leading end signal of the next following encoded block.

Further, the sequence controller comprises: a first encoding controller, responsive to a signal from the system controller which triggers an initiation of an encoding operation and a signal from the sync signal set-up section, for producing a first activation signal which activates the first encoder and a first enable signal which causes a region in the memory which is accessed by the first encoder to be changed; a second encoding controller for producing a second activation signal which activates the second encoder and a second enable signal which causes a region in the memory which is accessed by the second encoder to be changed; and a readout controller for producing an enable signal indicating that output data from the data reader is valid.

According to another aspect of the present invention, a data recorder for recording data onto a record medium on which a sync signal is inserted at a given interval, comprises: a sync detector for detecting a sync signal recorded on the record medium; a system controller for triggering an initiation of a recording operation; a sync signal set-up section for producing a leading end signal of an encoded block which is defined by a predetermined number of sectors on the basis of a result obtained by the sync detector in response to a command from the system controller; a memory for temporarily storing a result of an encoding processing operation; a first encoder for applying a first encoding processing operation upon input data which is to be recorded onto the record medium and for causing a result of the first encoding processing operation to be temporarily stored in the memory; a second encoder for applying a second encoding processing operation upon the result of the first encoding processing operation which is temporarily stored in the memory and for causing a result of the second encoding processing operation to be temporarily stored again in the memory; a data reader for reading out the result of the second encoding processing operation which is temporarily stored in the memory; a data transducer for transducing data which is read out by the data reader into a form which can be recorded onto the record medium; a pause signal producing section for producing a pause signal on the basis of a pause set-up signal produced by the system controller and commanding a suspension of the encoding processing operation, the pause signal deactivating or activating the first encoder, the second encoder and the data reader; and a sequence controller; wherein, after receiving the pause signal, the sequence controller deactivates the first encoder, the second encoder and the data reader independently from any status thereof in response to a leading end signal of an encoded block which is input from the sync signal set-up section; wherein, responsive to a command from the system controller which triggers an initiation of a recording operation subsequent to termination of the pause signal or to termination of the pause signal subsequent to a command from the system controller which triggers an initiation of a recording operation, the sequence controller activates the first encoder in response to a leading end signal of an encoded block from the sync signal set-up section, activates the first encoder and the second encoder in response to a leading end signal of the next encoded block, and activates the first encoder, the second encoder and the data reader in response to the leading end signal of the next following encoded block; and wherein, during the absence of the command from the system controller which triggers an initiation of a recording operation, the sequence controller deactivates the first encoder in response to a leading end signal of an encoded block from the sync signal set-up section, deactivates the first encoder and the second encoder in response to a leading end signal of the next encoded block, and deactivates the first encoder, the second encoder and the data reader in response to a leading end signal of the next following encoded block.

According to a further aspect of the present invention, a data recorder for recording data onto a record medium on which a sync signal and address information are inserted at a given interval, comprises: a sync detector for detecting the sync signal which is recorded on the record medium; a system controller for triggering an initiation of a recording operation; a sync signal set-up section for producing a leading end signal of an encoded block which is defined by a predetermined number of sectors on the basis of a result obtained by the sync detector in response to a command from the system controller; a memory for temporarily storing a result of an encoding processing operation; a first encoder for applying a first encoding processing operation upon input data which is to be recorded onto the record medium and for causing a result of the first encoding processing operation to be temporarily stored in the memory; a second encoder for applying a second encoding processing operation upon the result of the first encoding processing operation which is temporarily stored in the memory and for causing a result of the second encoding processing operation to be temporarily stored again in the memory; a data reader for reading out the result of the second encoding processing operation which is temporarily stored in the memory; a data transducer for transducing data which is read out by the data reader into a form which can be recorded onto the record medium; an address detector for detecting address position information from the address information which is recorded on the record medium; an address comparator for comparing the address obtained by the address detector against a predetermined value which is determined by the system controller; a pause signal producing section for receiving the pause set-up signal for indicating a suspension of the encoding processing operation and producing a pause signal which deactivates the first encoder, the second encoder and the data reader when the address comparator fails to detect a coincidence between the address and the predetermined value and which deactivates or activates the first encoder, the second encoder and the data reader when the address comparator finds a coincidence between the address and the predetermined value; and a sequence controller; wherein, after receiving the pause signal, the sequence controller deactivates the first encoder, the second encoder and the data reader independently from any status thereof in response to a leading end signal of an encoded block which is input from the sync signal set-up section; wherein, responsive to a command from the system controller which triggers an initiation of a recording operation subsequent to termination of the pause signal or to termination of the pause signal subsequent to a command from the system controller which triggers an initiation of a recording operation, the sequence controller activates the first encoder in response to a leading end signal of an encoded block from the sync signal set-up section, activates the first encoder and the second encoder in response to a leading end signal of the next encoded block, and activates the first encoder, the second encoder and the data reader in response to the leading end signal of the next following encoded block; and wherein, during the absence of the command from the system controller which triggers an initiation of a recording operation, the sequence controller deactivates the first encoder in response to a leading end signal of an encoded block from the sync signal set-up section, deactivates the first encoder and the second encoder in response to a leading end signal of the next encoded block, and deactivates the first encoder, the second encoder and the data reader in response to a leading end signal of the next following encoded block.

According to a yet further aspect of the present invention, a data recorder for recording data onto a record medium on which a sync signal, address information and sector information are inserted at a given interval, comprises: a sync detector for detecting a sync signal which is recorded on the record medium; a system controller for triggering an initiation of a recording operation; a sync signal set-up section for producing a leading end signal of an encoded block which is defined by a predetermined number of sectors on the basis of a result obtained by the sync detector in response to a command from the system controller; a memory for temporarily storing a result of an encoding processing operation; a first encoder for applying a first encoding processing operation upon input data which is to be recorded onto the record medium and for causing a result of the first encoding processing operation to be temporarily stored in the memory; a second encoder for applying a second encoding processing operation upon the result of the first encoding processing operation which is temporarily stored in the memory and for causing a result of the second encoding processing operation to be temporarily stored again in the memory; a data reader for reading out the result of the second encoding processing operation which is temporarily stored in the memory; a data transducer for transducing data which is read out by the data reader into a form which can be recorded onto the record medium; a defective sector detector for detecting a defective sector or sectors from the sector information which is recorded on the record medium, the data reader reading out, in the event the defective sector detector detects that a sector being recorded by the data transducer is a defective sector, the same data as the data recorded in the detected defective sector from the memory for the next following recording sector and reading out successive fresh data in the absence of any defective sector detected; an address detector for detecting address position information from the address information which is recorded on the record medium; an address comparator for comparing an address obtained by the address detector against a predetermined value determined by the system controller; a pause signal producing section for receiving the pause set-up signal for indicating a suspension of the encoding processing operation and producing a pause signal which deactivates the first encoder, the second encoder and the data reader when the address comparator fails to detect a coincidence between the address and the predetermined value and which deactivates or activates the first encoder, the second encoder and the data reader when the address comparator finds a coincidence between the address and the predetermined value; and a sequence controller; wherein, after receiving the pause signal, the sequence controller deactivates the first encoder, the second encoder and the data reader independently from any status thereof in response to a leading end signal of an encoded block which is input from the sync signal set-up section; wherein, responsive to a command from the system controller which triggers an initiation of a recording operation subsequent to termination of the pause signal or to termination of the pause signal subsequent to a command from the system controller which triggers an initiation of a recording operation, the sequence controller activates the first encoder in response to a leading end signal of an encoded block from the sync signal set-up section, activates the first encoder and the second encoder in response to a leading end signal of the next encoded block, and activates the first encoder, the second encoder and the data reader in response to the leading end signal of the next following encoded block; and wherein, during the absence of the command from the system controller which triggers an initiation of a recording operation, the sequence controller deactivates the first encoder in response to a leading end signal of an encoded block from the sync signal set-up section, deactivates the first encoder and the second encoder in response to a leading end signal of the next encoded block, and deactivates the first encoder, the second encoder and the data reader in response to a leading end signal of the next following encoded block.

Further, the sequence controller comprises: a first encoding controller, responsive to a signal from the system controller which triggers an initiation of an encoding operation, a signal from the sync signal set-up section and the pause signal, producing a first activation signal which activates the first encoder and a first enable signal which cause a region in the memory which is accessed by the first encoder to be changed; a second encoding controller for producing a second activation signal which activates the second encoder and a second enable signal which causes a region in the memory which is accessed by the second encoder to be changed; a readout controller for producing an enable signal indicating that output data from the data reader is valid; a first gate for gating an input to the first encoding controller with the pause signal; a second gate for gating an input to the second encoding controller with the pause signal; and a third gate for gating an input to the readout controller with the pause signal.

According to a yet further aspect of the present invention, a data producing circuit for producing data to be recorded onto a record medium on which a sync signal is inserted at a given interval, comprises: a sync detector for detecting the sync signal recorded on the record medium; a sync signal set-up section for producing a leading end signal of an encoded block which is defined by a predetermined number of sectors on the basis of a result obtained by the sync detector in response to a command from a system controller; a first encoder for applying a first encoding processing operation upon input data which is to be recorded onto the record medium; a second encoder for applying a second encoding processing operation upon a result of the first encoding processing operation; a data reader for reading out a result of the second encoding processing operation; and a sequence controller; wherein, after receiving the command from a system controller which triggers an initiation of a recording operation, the sequence controller activates the first encoder in response to a leading end signal of the encoded block from the sync signal set-up section, activates the first encoder and the second encoder in response to a leading end signal of the next encoded block, and activates the first encoder, the second encoder and the data reader in response to a leading end signal of the next following encoded block; and wherein, during the absence of the command from the system controller which triggers an initiation of a recording operation, the sequence controller deactivates the first encoder in response to a leading end signal of an encoded block from the sync signal set-up section, deactivates the first encoder and the second encoder in response to a leading end signal of the next encoded block, and deactivates the first encoder, the second encoder and the data reader in response to a leading end signal of the next following encoded block.

According to a yet further aspect of the present invention, a data producing circuit for producing data to be recorded onto a record medium on which a sync signal is inserted at a given interval, comprises: a sync detector for detecting a sync signal recorded on the record medium; a sync signal set-up section for producing a leading end signal of an encoded block which is defined by a predetermined number of sectors on the basis of a result obtained by the sync detector in response to a command from a system controller; a first encoder for applying a first encoding processing operation upon input data which is to be recorded onto the record medium; a second encoder for applying a second encoding processing operation upon the result of the first encoding processing operation which is temporarily stored in the memory and for causing a result of the second encoding processing operation to be temporarily stored again in the memory; a data reader for reading out the result of the second encoding processing operation which is temporarily stored in the memory; a pause signal producing section for producing a pause signal on the basis of a pause set-up signal produced by the system controller and commanding a suspension of the encoding processing operation, the pause signal deactivating or activating the first encoder, the second encoder and the data reader; and a sequence controller; wherein, after receiving the pause signal, the sequence controller deactivates the first encoder, the second encoder and the data reader independently from any status thereof in response to a leading end signal of an encoded block which is input from the sync signal set-up section; wherein, responsive to a command from the system controller which triggers an initiation of a recording operation subsequent to termination of the pause signal or to termination of the pause signal subsequent to a command from the system controller which triggers an initiation of a recording operation, the sequence controller activates the first encoder in response to a leading end signal of an encoded block from the sync signal set-up section, activates the first encoder and the second encoder in response to a leading end signal of the next encoded block, and activates the first encoder, the second encoder and the data reader in response to the leading end signal of the next following encoded block; and wherein, during the absence of the command from the system controller which triggers an initiation of a recording operation, the sequence controller deactivates the first encoder in response to a leading end signal of an encoded block from the sync signal set-up section, deactivates the first encoder and the second encoder in response to a leading end signal of the next encoded block, and deactivates the first encoder, the second encoder and the data reader in response to a leading end signal of the next following encoded block.

According to a yet further aspect of the present invention, a data producing circuit for producing data to be recorded onto a record medium on which a sync signal and address information are inserted at a given interval, comprises: a sync detector for detecting the sync signal which is recorded on the record medium; a sync signal set-up section for producing a leading end signal of an encoded block which is defined by a predetermined number of sectors on the basis of a result obtained by the sync detector in response to a command from a system controller; a first encoder for applying a first encoding processing operation upon input data which is to be recorded onto the record medium; a second encoder for applying a second encoding processing operation upon a result of the first encoding processing operation; a data reader for reading out a result of the second encoding processing operation; an address detector for detecting address position information from the address information which is recorded on the record medium; an address comparator for comparing the address obtained by the address detector against a predetermined value which is determined by the system controller; a pause signal producing section for receiving the pause set-up signal for indicating a suspension of the encoding processing operation and producing a pause signal which deactivates the first encoder, the second encoder and the data reader when the address comparator fails to detect a coincidence between the address and the predetermined value and which deactivates or activates the first encoder, the second encoder and the data reader when the address comparator finds a coincidence between the address and the predetermined value; and a sequence controller; wherein, after receiving the pause signal, the sequence controller deactivates the first encoder, the second encoder and the data reader independently from any status thereof in response to a leading end signal of an encoded block which is input from the sync signal set-up section; wherein, responsive to a command from the system controller which triggers an initiation of a recording operation subsequent to termination of the pause signal or to termination of the pause signal subsequent to a command from the system controller which triggers an initiation of a recording operation, the sequence controller activates the first encoder in response to a leading end signal of an encoded block from the sync signal set-up section, activates the first encoder and the second encoder in response to a leading end signal of the next encoded block, and activates the first encoder, the second encoder and the data reader in response to the leading end signal of the next following encoded block; and wherein, during the absence of the command from the system controller which triggers an initiation of a recording operation, the sequence controller deactivates the first encoder in response to a leading end signal of an encoded block from the sync signal set-up section, deactivates the first encoder and the second encoder in response to a leading end signal of the next encoded block, and deactivates the first encoder, the second encoder and the data reader in response to a leading end signal of the next following encoded block.

According to a yet further aspect of the present invention, a data producing circuit for producing data to be recorded onto a record medium on which a sync signal, address information and sector information are inserted at a given interval, comprises: a sync detector for detecting a sync signal which is recorded on the record medium; a sync signal set-up section for producing a leading end signal of an encoded block which is defined by a predetermined number of sectors on the basis of a result obtained by the sync detector in response to a command from a system controller; a first encoder for applying a first encoding processing operation upon input data which is to be recorded onto the record medium; a second encoder for applying a second encoding processing operation upon the result of the first encoding processing operation; a data reader for reading out the result of the second encoding processing operation which is temporarily stored in the memory; a defective sector detector for detecting a defective sector or sectors from the sector information which is recorded on the record medium, the data reader reading out, in the event the defective sector detector detects that a sector being recorded by the data transducer is a defective sector, the same data as the data recorded in the detected defective sector from the memory for the next following recording sector and reading out successive fresh data in the absence of any defective sector detected; an address detector for detecting address position information from the address information which is recorded on the record medium; an address comparator for comparing an address obtained by the address detector against a predetermined value determined by the system controller; a pause signal producing section for receiving the pause set-up signal for indicating a suspension of the encoding processing operation and producing a pause signal which deactivates the first encoder, the second encoder and the data reader when the address comparator fails to detect a coincidence between the address and the predetermined value and which deactivates or activates the first encoder, the second encoder and the data reader when the address comparator finds a coincidence between the address and the predetermined value; and a sequence controller; wherein, after receiving the pause signal, the sequence controller deactivates the first encoder, the second encoder and the data reader independently from any status thereof in response to a leading end signal of an encoded block which is input from the sync signal set-up section; wherein, responsive to a command from the system controller which triggers an initiation of a recording operation subsequent to termination of the pause signal or to termination of the pause signal subsequent to a command from the system controller which triggers an initiation of a recording operation, the sequence controller activates the first encoder in response to a leading end signal of an encoded block from the sync signal set-up section, activates the first encoder and the second encoder in response to a leading end signal of the next encoded block, and activates the first encoder, the second encoder and the data reader in response to the leading end signal of the next following encoded block; and wherein, during the absence of the command from the system controller which triggers an initiation of a recording operation, the sequence controller deactivates the first encoder in response to a leading end signal of an encoded block from the sync signal set-up section, deactivates the first encoder and the second encoder in response to a leading end signal of the next encoded block, and deactivates the first encoder, the second encoder and the data reader in response to a leading end signal of the next following encoded block.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

First Embodiment

Figure 1:
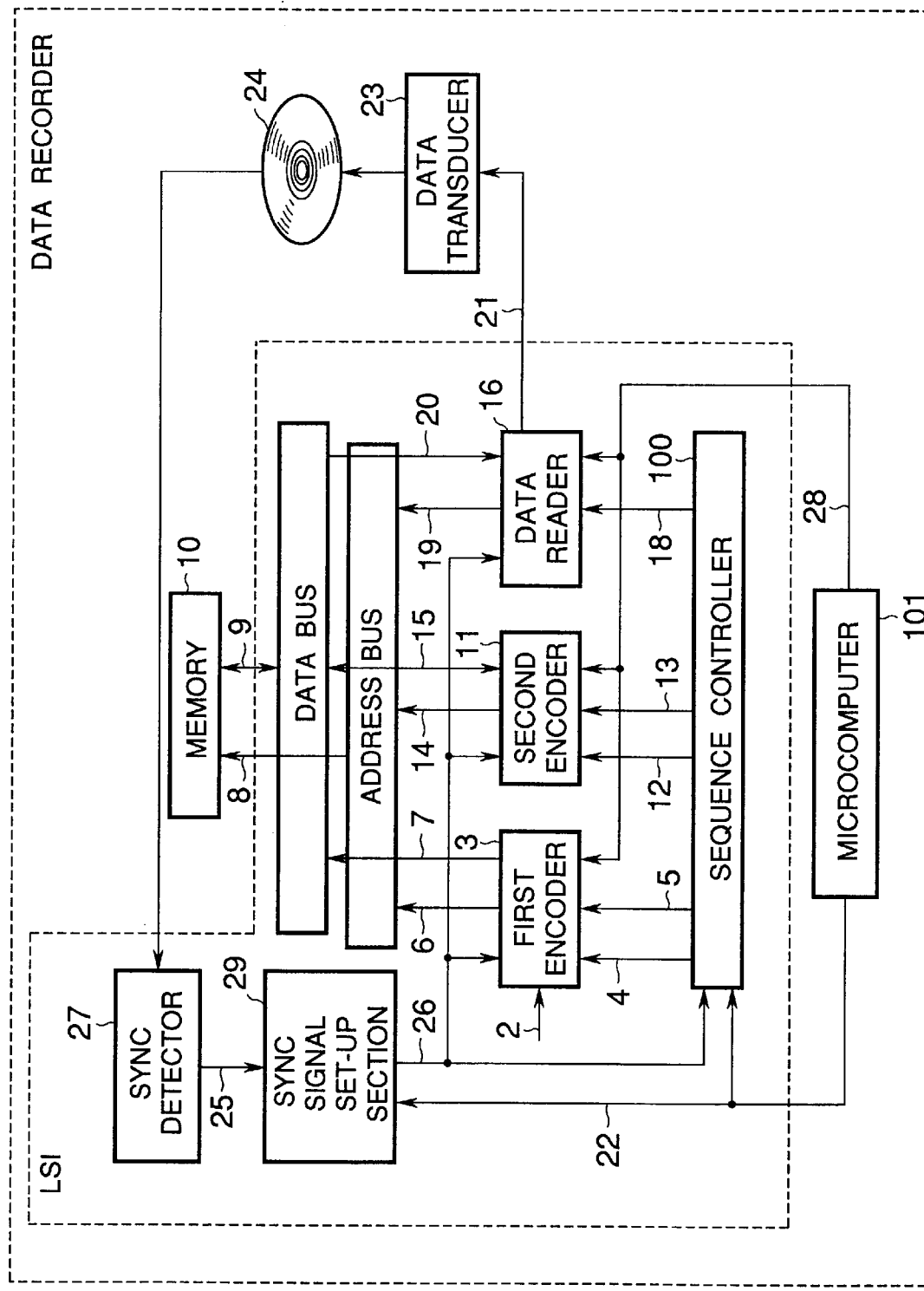
FIG. 1 is a block diagram showing a data recorder according to a first embodiment of the present invention.

FIG. 1 is a block diagram showing a data recorder according to a first embodiment of the present invention. As shown in FIG. 1, the data recorder includes for applying a first encoding processing operation to input data 2 which is to be recorded onto a record medium 24 such as a DVD-RAM for temporary storage in a memory 10 and being activated by a first activation signal 4, a second encoder 11 for reading first data 7 which is temporarily stored in the memory 10, applying a second encoding processing operation to the data before it is temporarily stored again in the memory 10, and being activated by a second activation signal 12, a data reader 16 which sends data 20 read out from the memory 10 to a data transducer 23, a sequence controller 100 which controls the operation of the first encoder 3, the second encoder 11 and the data reader 16, and a microcomputer 101 which controls the sequence controller 100. The data recorder also includes a sync detector 27 for detecting the sync signal recorded on the record medium 24, a sync signal set-up section 29 for producing a leading end signal of an encoded block which is defined by sixteen sectors on the basis of a result obtained by the sync detector 27 in response to a command from the microcomputer 101, a memory 10 for temporarily storing a result of an encoding processing operation, and a data transducer 23 for transducing data which is read out by the data reader 16 into a form which can be recorded onto the record medium 24.

Figure 2:
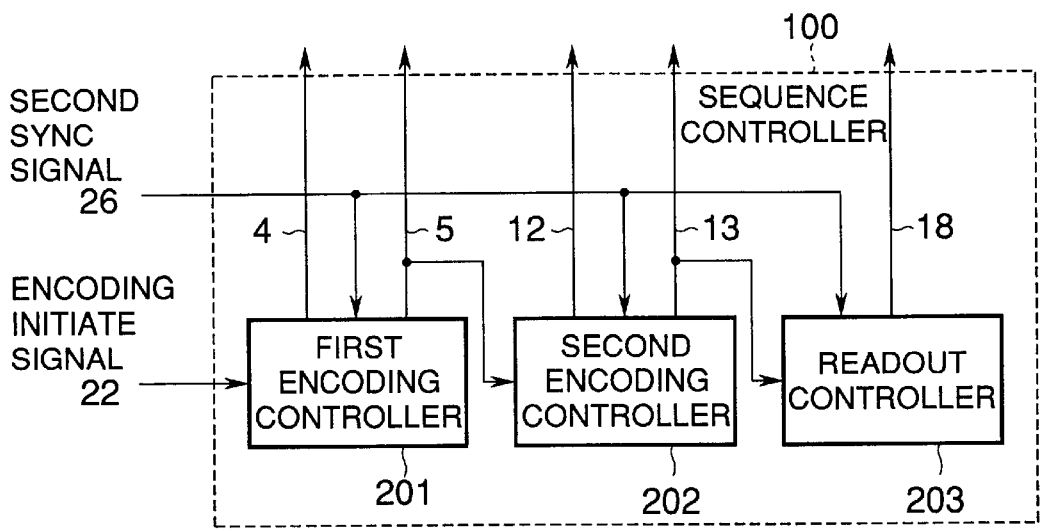
FIG. 2 is a block diagram showing a sequence controller of FIG. 1.

FIG. 2 is a block diagram showing the sequence controller 100. As shown in FIG. 2, the sequence controller 100 includes a first encoding controller 201 which receives an encoding initiate signal 22 and a second sync signal 26 and produces a first activation signal 4 and a first enable signal 5, a second encoding controller 202 which receives the first enable signal 5 and the second sync signal 26 and produces a second activation signal 12 and a second enable signal 13, and a readout controller 203 which receives the second enable signal 13 and the second sync signal 26 and produces a third enable signal 18. It is to be understood that in FIG. 1, the sequence controller 100 is implemented in a single IC (i.e., an LSI as a data producing circuit shown in FIG. 1) together with the first encoder 3, the second encoder 11 and the data reader 16.

Figure 3:
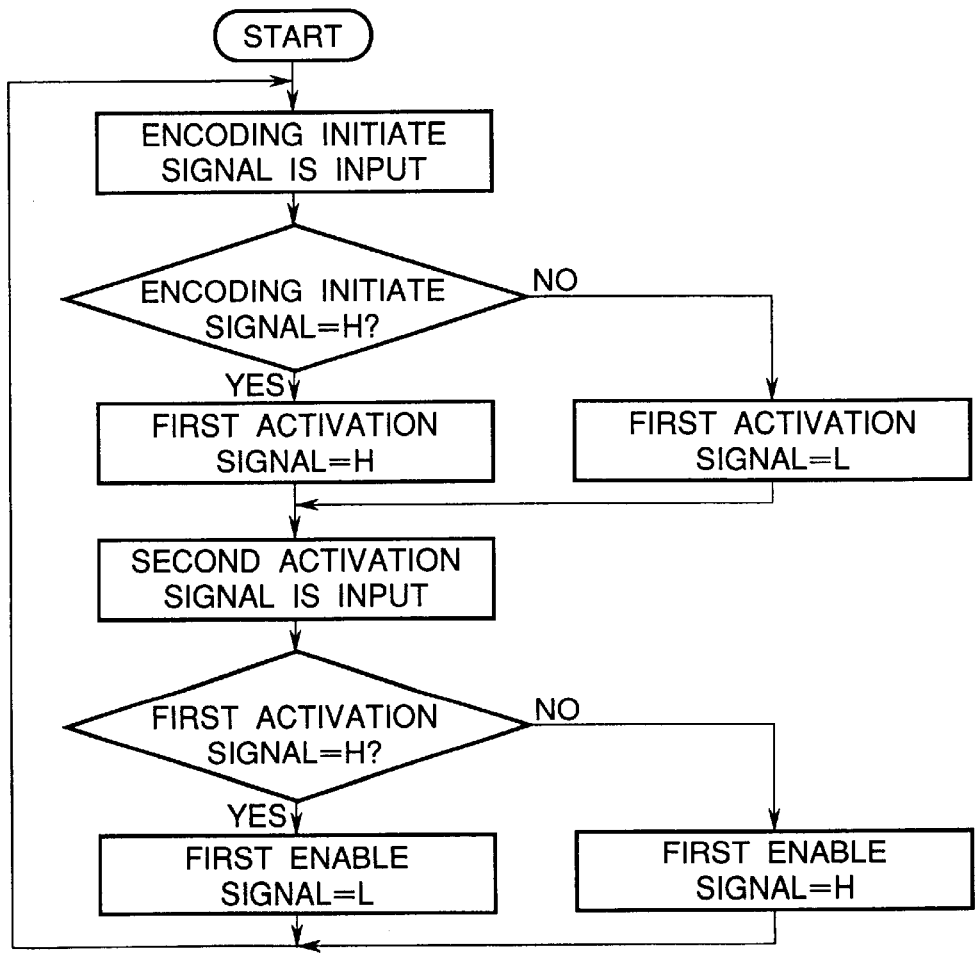
FIG. 3 is a flow chart illustrating the operation of a first encoding controller of FIG. 2.
Figure 4:
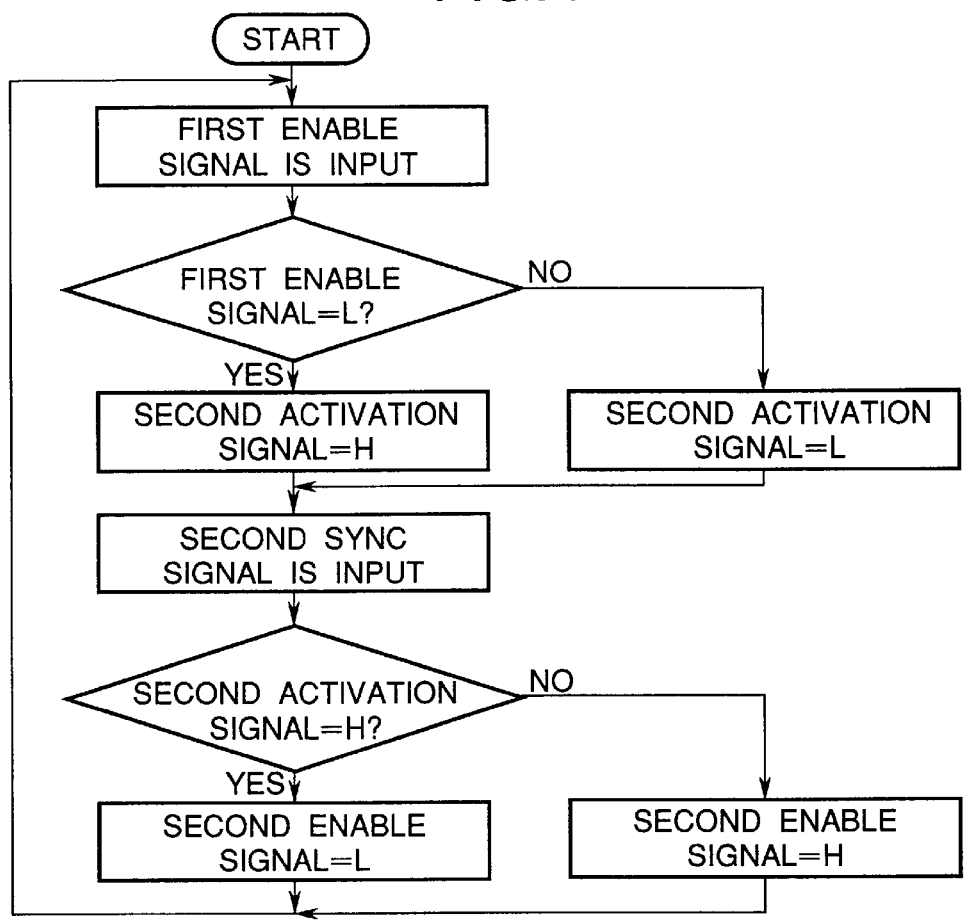
FIG. 4 is a flow chart illustrating the operation of a second encoding controller of FIG. 2.
Figure 5:
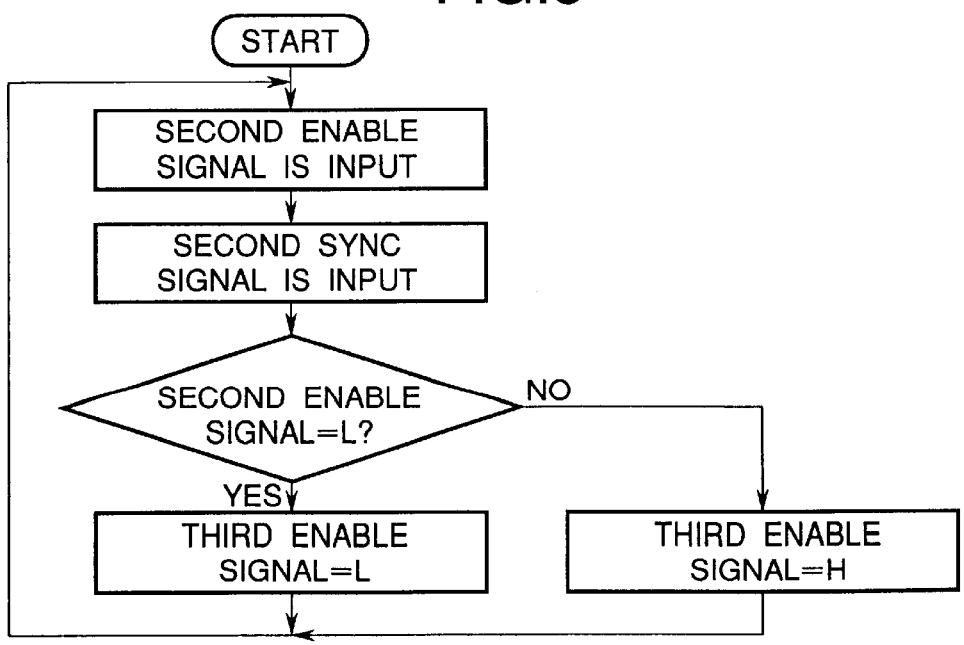
FIG. 5 is a flow chart illustrating the operation of a readout controller of FIG. 2.
Figure 6:
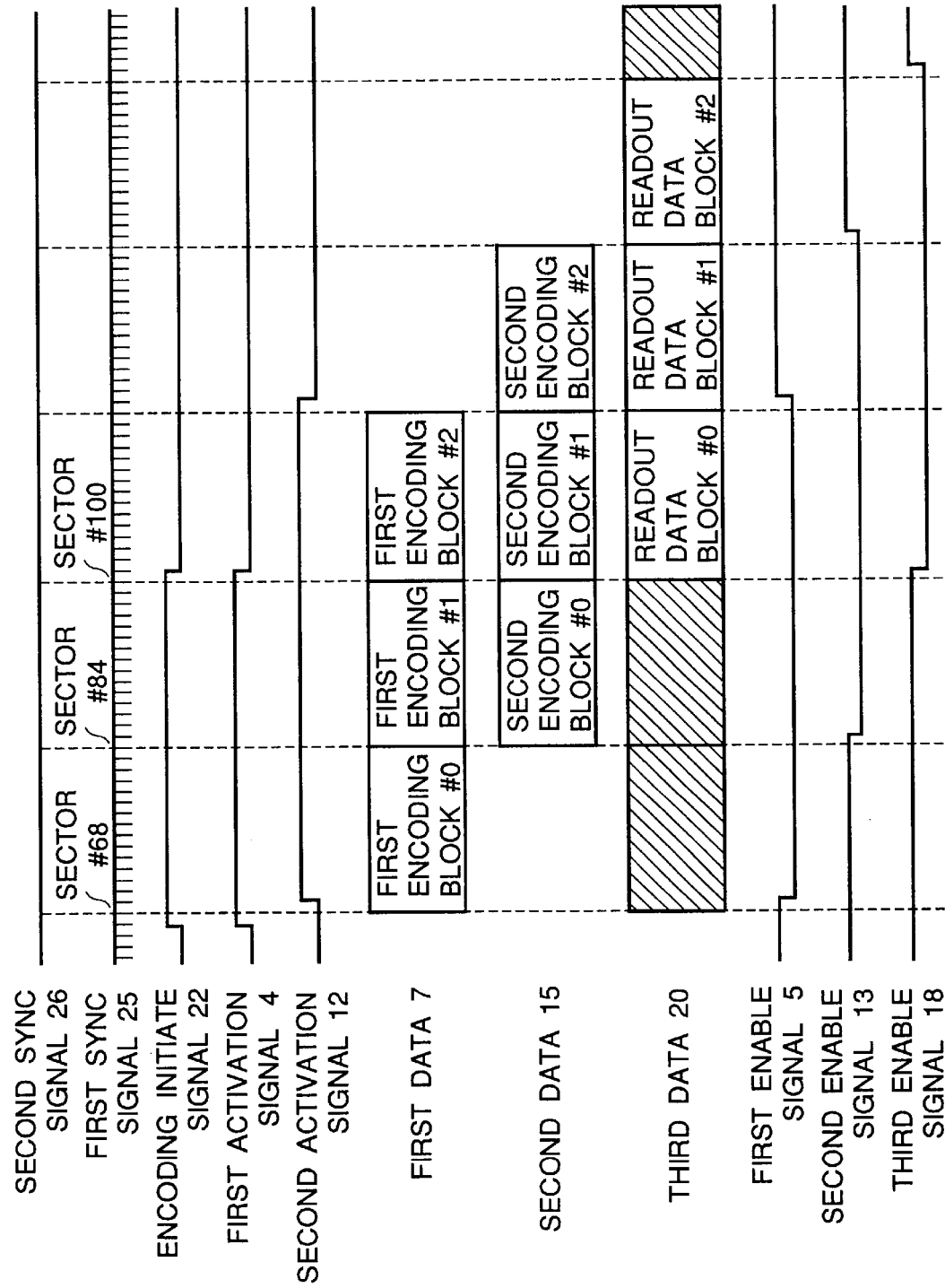
FIG. 6 is a timing chart illustrating the operation of the data recorder of FIG. 1.

FIG. 3 is a flow chart illustrating the operation of the first encoding controller 201, FIG. 4 is a flow chart illustrating the operation of the second encoding controller 202, FIG. 5 is a flow chart illustrating the operation of the readout controller 203, and FIG. 6 is a timing chart illustrating the operation of the data recorder of FIG. 1.

The operation of the data recorder of the first embodiment will now be described with reference to FIG. 1 to FIG. 6. The first encoder 3, the second encoder 11 and the data reader 16 are initialized by an initialize signal 28 from the microcomputer 101 so that a region in memory 10 which is initially accessed by the first encoder 3, the second encoder 11 and the data reader 16 is chosen to be a block #0.

A sync detector 27 receives sector information from a record medium 24 to produce a first sync signal 25. Address information is recorded at a leading end of a sector, and accordingly, the first sync signal 25 corresponds to the sector address. In order to initiate an encoding operation, the microcomputer 101 sets the encoding initiate signal 22 to its H (high) level. A sync signal set-up section 29 delivers a second sync signal 26 at the timing of the first sync signal 25 which follows the input of the encoding initiate signal 22. In the present example, it is the second sync signal 26 produced from sector information located at a sector address #68 of the record medium 24. The sync signal set-up section 29 counts the first sync signal 25, and delivers the second sync signal 26 after every sixteen periods thereof. This is because sixteen sectors constitute one block.

The operation of the first encoding controller 201, the second encoding controller 202 and the readout controller 203, shown in FIG. 2, which constitute together the sequence controller 100 will be described with reference to the flow charts shown in FIG. 3 to FIG. 5 and the timing chart shown in FIG. 6.

When the encoding initiate signal 22 is input at its H level indicating the initiation of an encoding operation, the first encoding controller 201 sets the first activation signal 4 to its H level to activate the first encoder 3 by a procedure indicated in FIG. 3. When the second sync signal 26 is input subsequent to the input of the first activation signal 4, the first encoder 3 initiates its encoding processing operation and performs a write-in into a region of block #0 in the memory 10, and completes its processing operation until the next second sync signal 26 is input. On the other hand, when the first activation signal 4 assumes its H level and when the second sync signal 26 is input, the first encoding controller 201 sets the first enable signal 5 to its L level so that an address where the first encoder 3 writes into the memory 10 is updatable.

When the first encoder 3 has completed its write-in into the block #0 and the second sync signal is input while the first enable signal 5 assumes its L (low) level, the first encoder 3 changes a write-in region from the block #0 to the block #1, and performs an encoding processing operation upon fresh input data 2, which is then written into the block #1.

When the first enable signal 5 assumes its L level, the second encoding controller 202 sets the second activation signal 12 to its H level to activate the second encoder 11. The second encoder 11 initiates its encoding processing operation in response to the second sync signal 26 after the second activation signal 12 has been input, by reading out data from the region of the block #0 in the memory 10 which was previously written into during the first encoding processing operation, applying the second encoding processing operation to the data which is read out, followed by writing the processed data into the block #0 again. This processing operation is completed by the time the next second sync signal 26 is input. When the second activation signal 12 remains at its H level and the second sync signal 26 is input, the second encoding controller 202 sets the second enable signal 13 to its L level so that an address at which the second encoder 11 writes into the memory 10 is updatable.

After the completion of the write-in operation of the second encoder 11 into the block #0 and when the second sync signal 26 is input while the second enable signal 13 assumes its L level, the second encoder 11 changes a write-in region from the block #0 to the block #1 so that the second encoder 11 then reads out the data which is written into the block #1 by the first encoder 3, and applies an encoding processing thereto, whereupon it writes the processed data into the block #1 again.

The data reader 16 repeatedly performs a readout from the block #0 which is initialized by the microcomputer 101. When the second enable signal 13 of an L level and the second sync signal 26 are input to the readout controller 203, the third enable signal 18 is output at its L level. The data which is read out by the data reader 16 is fed to the data transducer 23 as a valid data output 21 when the third enable signal 18 assumes its L level.

After the completion of a readout of the data reader 16 from the block #0 and when the second sync signal 26 is input while the third enable signal 18 assumes its L level, the data reader 16 changes a readout region from the block #0 to the block #1 so as to enable a readout of data which is written into the block #1 by the second encoder 11.

Figure 17:
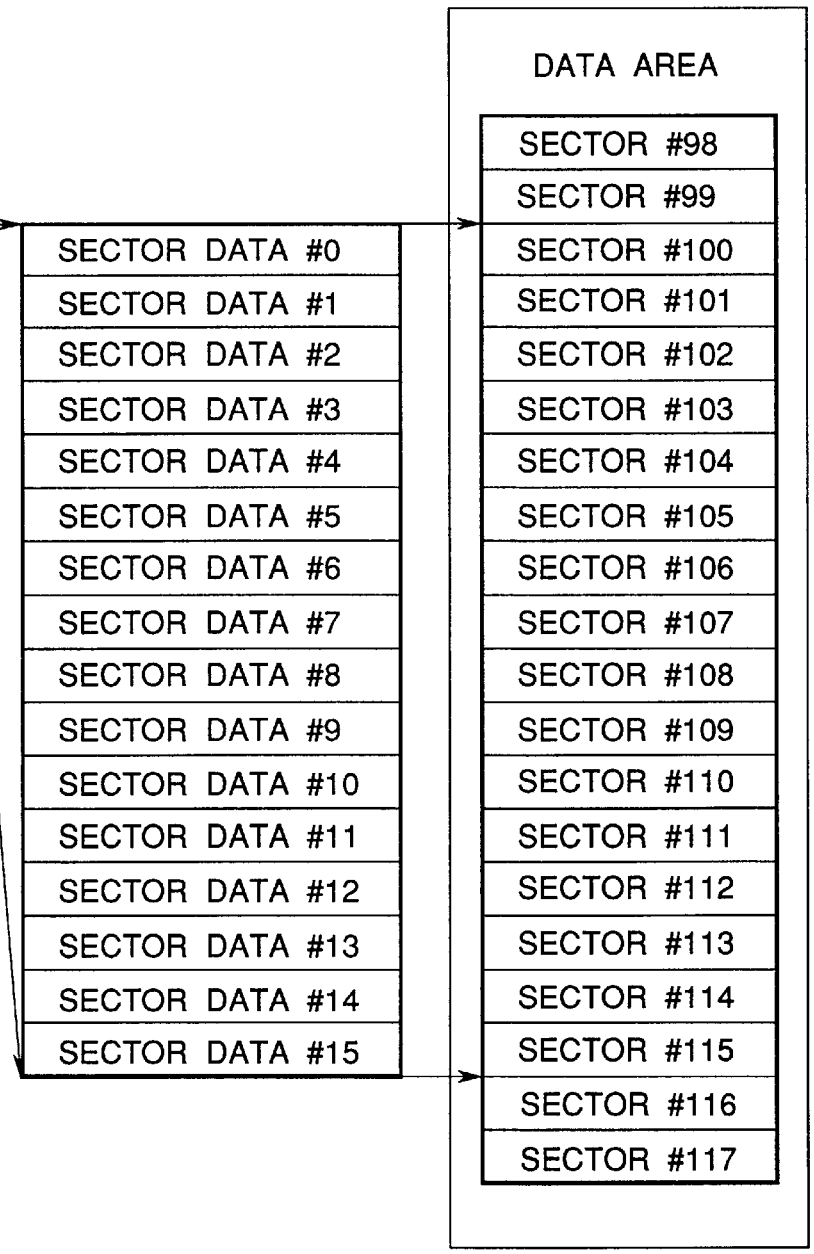
FIG. 17 is a diagram showing a correspondence of data structures between a memory and a record medium.

The data which is fed to the data transducer 23 is transduced into a signal form for recording onto the record medium 24, and is then recorded thereon. As shown in FIG. 17, sector data which is read out from the memory 10 are recorded on the sectors of the record medium 24, respectively.

When the data reader 16 begins to read out data from the block #0, the microcomputer 101 sets the encoding initiate signal 22 to its L level, and the first activation signal 4 then assumes its L level simultaneously. When the next second sync signal is input, the first encoding controller 201 establishes a block #3 as a block which is to be accessed by the first encoder 3 subsequently, and sets the first enable signal 5 to its H level. However, the first encoder 3 does not perform an encoding processing operation because the first activation signal 4 assumes its L level.

The second encoding controller 202 sets the second activation signal 12 to its L level at the same time as the first enable signal 5 changes from its L level to its H level. Since the second activation signal 12 assumes its H level at the time when the second sync signal is input, the second encoder 11 applies an encoding processing operation upon data from the block #2 of the memory 10. At the same time, the data reader 16 reads out data from the block #1 of the memory 10.

At the timing of the next second sync signal 26, the second encoder 202 establishes a block #3 as a block which is to be accessed by the second encoder 11 subsequently, and then sets the second enable signal 13 to its H level. However, the second encoder 11 does not perform an encoding processing operation because the second activation signal 12 assumes its L level, while the data reader 16 reads out data from the block #2 of the memory 10.

When the second sync signal 26 is input subsequent to the completion of a readout of the data reader 16 from the block #3, the readout controller 203 establishes the block #3 as a block which is to be accessed by the data reader 16 next, and then sets the third enable signal 18 to its H level.

This completes the write-in operation of data into three blocks.

Since the sequence controller 100 activates and deactivates the first encoder 3, the second encoder 11 and the data reader 16, data to be recorded onto the record medium 24 is produced while alleviating the demand on the microcomputer, which is only required to set up the encoding initiate signal. As a consequence of alleviating the demand on the microcomputer, an inexpensive microcomputer of a low processing capability may be used, thus allowing a reduction in the cost of the system.

When the encoding initiate signal is input, the first encoder 3 is activated in response to the second sync signal, and the second encoder 11 is activated in response to the next second sync signal and output data from the data reader 16 is validated in response to the second sync signal, thus allowing an automatic changeover of sequential steps in the procedure of applying an encoding processing operation upon the input data.

Second Embodiment

Figure 7:
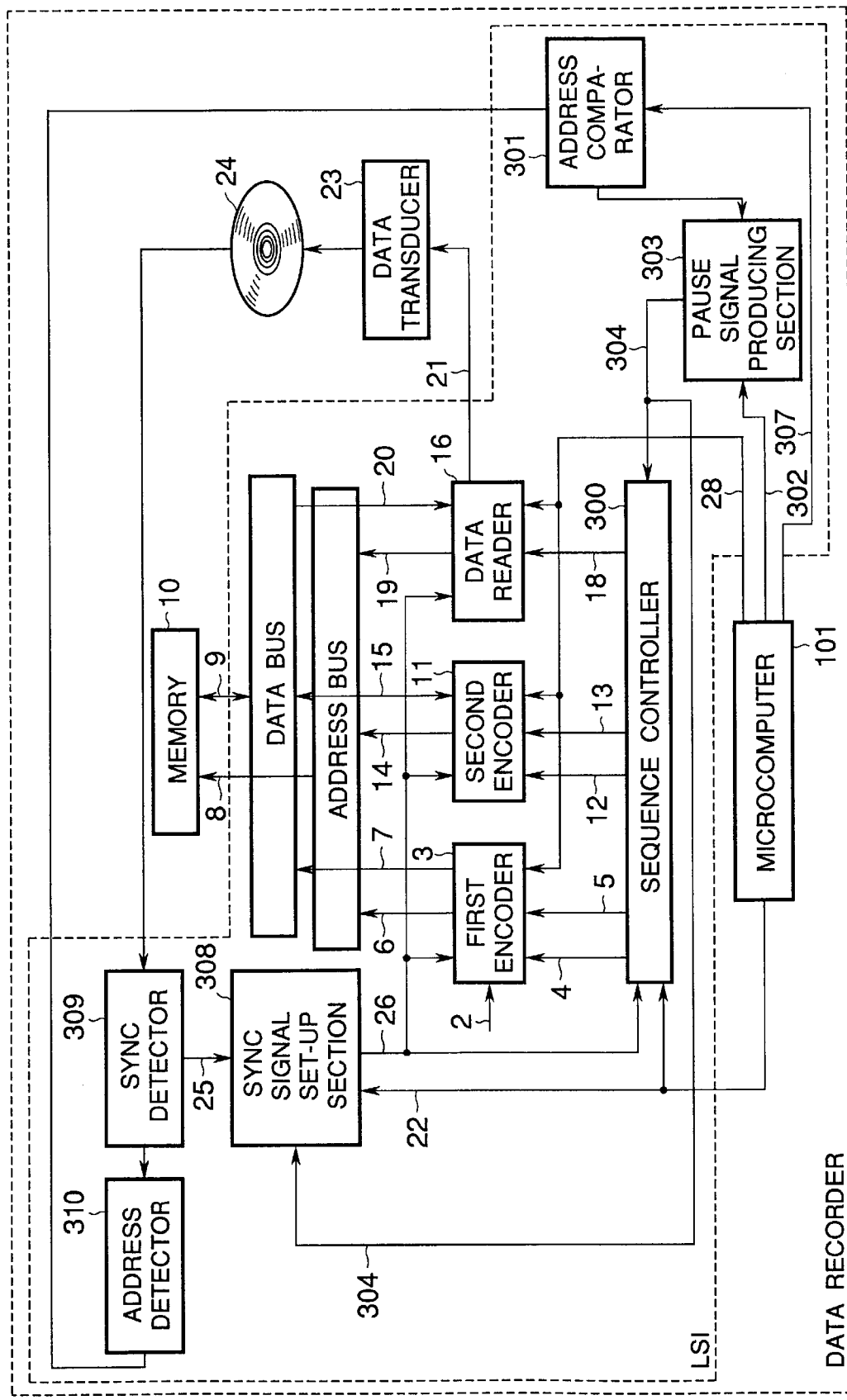
FIG. 7 is a block diagram showing a data recorder according to a second embodiment of the present invention.

FIG. 7 is a block diagram showing a data recorder according to a second embodiment of the present invention, and it is to be understood that parts identical to or corresponding to those shown in FIG. 1 are designated by like reference characters as used before. As shown in FIG. 7, the data recorder of the second embodiment includes a sequence controller 300 which suspends a sequence whenever a pause signal 304 assumes its H level, an address comparator 301 which detects address information from the record medium 24 and compares it against an address which is established by the microcomputer 101 and outputs an H level whenever a coincidence is found therebetween, and a pause signal producing section 303 which outputs a pause signal 304 in accordance with a pause set-up signal 302 and sets the pause signal 304 to its L level whenever an H level is output from the address comparator 301 indicating the detection of a coincidence. The pause set-up signal 302 is output from the microcomputer 101 at its H level whenever the operation of the sequence controller 300 is to be suspended. In addition, the microcomputer 101 establishes a start address 307.

The data recorder also includes a second sync signal set-up section 308 which does not respond to an input of sixteen first sync signals 25 by outputting a second sync signal 26 if the pause signal 304 prevails at the time, but outputs the second sync signal at the timing of the first sync signal 25 which is initially input after the termination of the pause signal 304, a sync detector 309 which detects a sync signal recorded on the record medium 24 to output the first sync signal 25, thus outputting address information, and an address detector 310 which detects an address from the address information. It is to be understood that the sequence controller 300 is implemented in a single IC (an LSI as a data producing circuit shown in FIG. 7) together with the first encoder 3, the second encoder 11 and the data reader 16.

Figure 8:
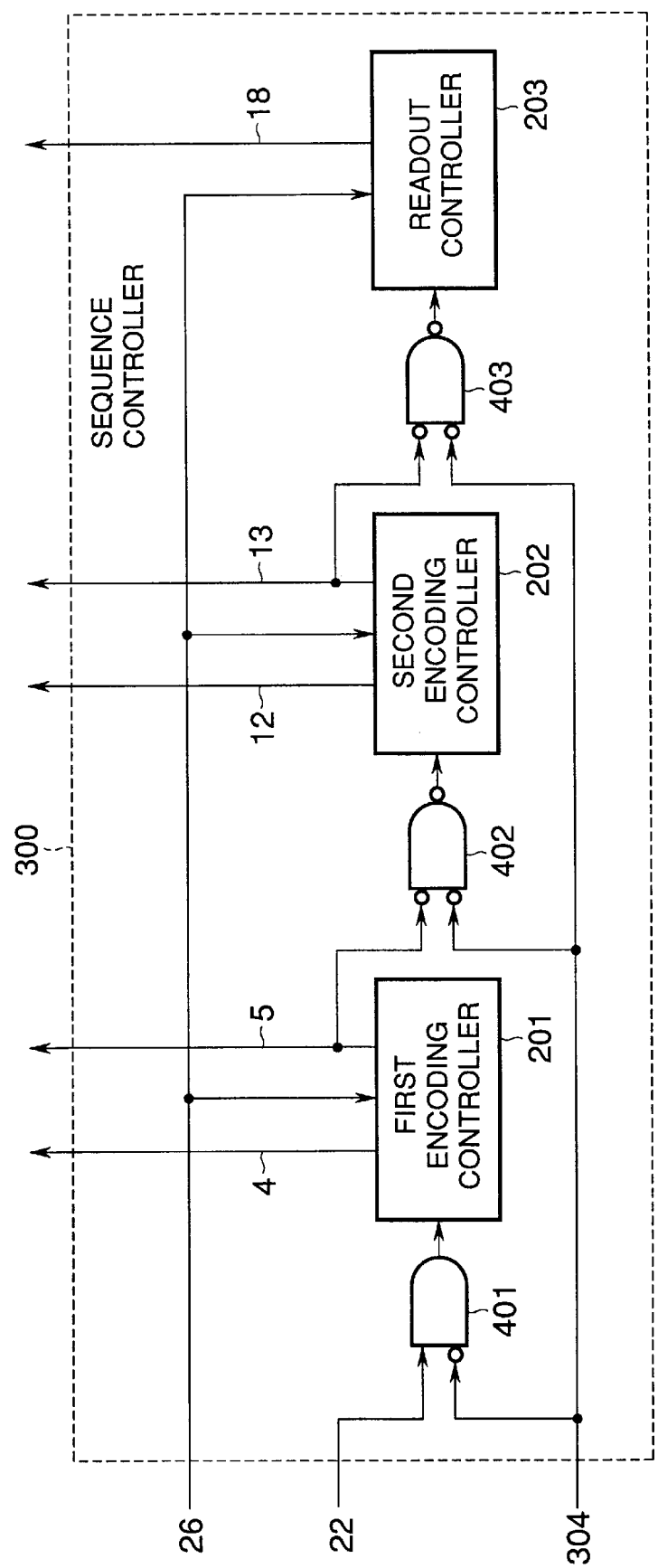
FIG. 8 is a block diagram showing a sequence controller of FIG. 7.

FIG. 8 is a block diagram showing the sequence controller 300 of FIG. 7. In addition to the controllers 201, 202 and 203 which are mentioned previously, the sequence controller 300 includes a first pause gate 401 having an output which assumes an L level independently from the encoding initiate signal 22 whenever the pause signal 304 assumes its H level, a second pause gate 402 having an output which assumes an H level independently from the first enable signal 5 whenever the pause signal 304 assumes its H level, and a third pause gate 403 having an output which assumes an H level independently from the second enable signal 13 whenever the pause signal 304 assumes its H level.

Figure 9:
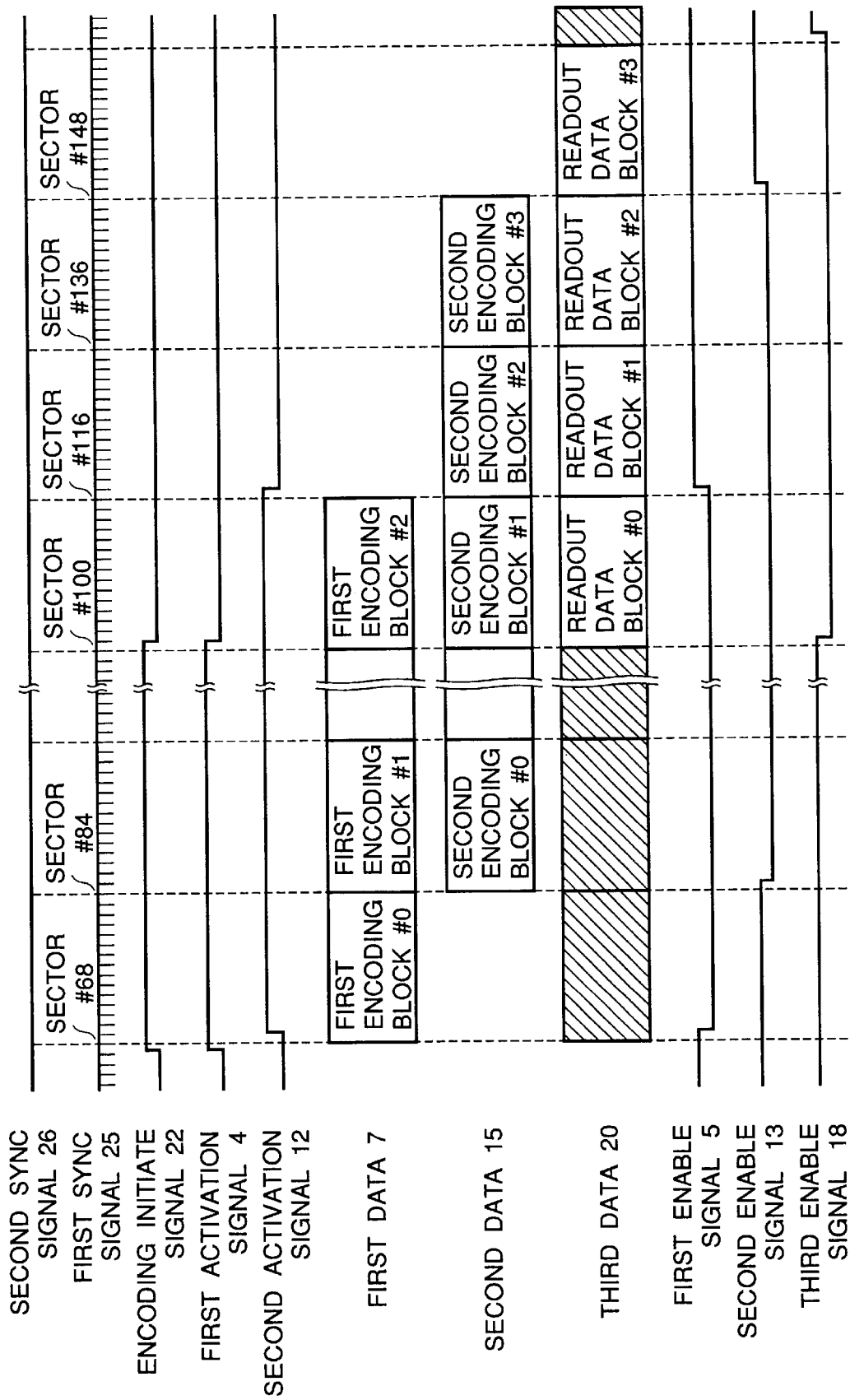
FIG. 9 is a timing chart illustrating the operation of the data recorder of FIG. 7.

FIG. 9 is a timing chart which illustrate the operation of the sequence controller 300. The operation of the data recorder of the second embodiment will now be described with reference to FIG. 8 and FIG. 9.

The microcomputer 101 first sends the start address 307 to the address comparator 301 to establish a sector address where data is to be written into the record medium 24 at a sector #100.

The microcomputer 101 then sends the encoding initiate signal 22 to the second sync signal set-up section 308 and the sequence controller 300 immediately before a sector #50. The first encoding controller 101 sets the first activation signal 4 to its H level, and the first encoder 3 initiates its encoding operation subsequent to the input of the second sync signal 26, thus writing into the block #0. The first encoding controller 201 sets the first enable signal 5 to its L level after the input of the second sync signal 26. When the next second sync signal 26 is input, the first encoder 3 applies an encoding processing operation upon input data 2, and the processed data is written into the block #1.

The second encoding controller 202 detects the L level of the first enable signal 5, and sets the second activation signal 12 to its H level. Because the second activation signal 12 is at its H level, the second encoder 11 reads out data from the block #0 of the memory 10 when the second sync signal 26 is input, applies an encoding processing operation upon the data which is read out, and then writes the processed data into the block #0 again. The second encoding controller 202 sets the second enable signal 13 to its L level when the second sync signal 26 is input.

After the initiation of the encoding processing operation by the second encoder 11, the microcomputer 101 delivers the pause set-up signal 302 at its H level. On the other hand, the address detector 310 fails to detect a sector #100, and thus the address comparator 301 cannot detect a coincidence with the established address. Because the pause set-up signal 302 is at its H level and the address coincidence is not detected, the pause signal producing section 303 delivers the pause signal 304 at its H level. An output from the first pause gate 101 assumes an L level because the pause signal 304 is at its H level, and the first activation signal 4 assumes its L level simultaneously. Because an output from the second pause gate 402 is at its H level, the second activation signal 12 also assumes an L level.

Because the pause signal 304 assumes its H level, the sync signal set-up section 308 does not deliver the second sync signal 26 if it has counted the first sync signal 25, sixteen times. However, both the first encoder 3 and the second encoder 11 have completed their processing operations during the time the first sync signal 25 occurs sixteen times. The first enable signal 5 and the second enable signal 13 remain unchanged because the second sync signal 26 is not input. Since sector information is successively input to the sync detector 27 from the record medium 24, the sync detector 27 continues to deliver the first sync signal 25. Because the third enable signal 18 does not assume its L level, the data reader 16 does not deliver any valid data.

As the sector address detected from the record medium 24 progresses, the address detector 310 detects a sector #100, and when the sector #100 is input to the address comparator 301, the address comparator 301 delivers a coincidence of addresses, whereupon the pause signal producing section 303 sets the pause signal 304 to its L level.

When the pause signal 304 assumes its L level, an output from the first pause gate 401 changes to its H level, whereupon the first activation signal 4 assumes its H level. An output from the second pause gate 402 assumes its L level, whereby the second activation signal 13 assumes its H level.

When the pause signal 304 assumes its L level, the second sync signal set-up section 308 delivers the second sync signal 26 in synchronism with a first sync signal 25 which corresponds to the sector #100 and which is input immediately after a change in the pause signal 304 to its L level.

The first encoder 3 performs an encoding processing operation when the first activation signal 4 assumes its H level and the second sync signal 26 is input. Similarly, the second encoder 13 performs an encoding processing operation when the second activation signal 12 assumes its H level and the second sync signal 26 is input. Because the first and the second activation signal assume an H level, both the first enable signal 4 and the second enable signal 12 change to an L level in response to the second sync signal.

An output from the readout controller 203 changes to its L level when the output from the third pause gate 403 assumes its L level and the second sync signal 26 which corresponds to the sector #100 is input. The data reader 16 reads out sector data from the block #0 of the memory 10, which data provides data output 21 as valid data because the third enable signal 18 assumes its L level. In response to the data output 21, the data transducer 23 begins to write the sector data onto the record medium 24 beginning with the sector #100, as shown in FIG. 17.

In the second embodiment, the output from the pause signal producing section 303 is controlled by the address comparator 301, but a similar result can be achieved by enabling the microcomputer 101 to change the pause set-up signal 302 to its L level at the same timing.

As described above, the pause signal producing section 303 delivers the pause signal 304 to the sequence controller 300, which then responds thereto by deactivating the first encoder 3 and the second encoder 11 in response to the second sync signal which immediately follows the pause signal 304 and by invalidating data from the data reader 16. When the pause signal 304 is terminated, the sequence controller 300 activates the first encoder 3 and the second encoder 11 and validate data from the data reader 16 in response to the second sync signal which immediately follows the termination of the pause signal 304. In this manner, when the pause signal 304 is input to the sequence controller 300, data which is just prior to its readout remains stored in the memory 10, while when the pause signal 304 is terminated at a point where the write-in operation is desired, the recording onto the record medium 24 can be rapidly initiated.

Further, while the pause signal producing section 303 delivers the pause signal to the sequence controller 300, the address comparator 301 compares detected sector address information against a predetermined value, and terminates the pause signal 304 in the event a coincidence is found between the sector address information and the predetermined value. In the presence of the pause signal 304, the sequence controller 300 deactivates the first encoder 3 and the second encoder 11 and invalidate data from the data reader 16 in response to the second sync signal which immediately follows the input of the pause signal 304, but when the pause signal 304 is terminated, it activates the first encoder 3 and the second encoder 11 and validate data from the data reader 16 in response to the second sync signal which immediately follows the termination of the pause signal 304. When the pause signal 304 is applied to the sequence controller 300, the pause signal 304 causes data which is just prior to its readout operation remains stored in the memory 10, and when a given write-in position is detected, the pause signal 304 may be terminated to allow a recording on the recording medium 24 to be initiated rapidly, beginning with a given position.

In addition, the sequence controller 300 is responsive to the encoding initiate signal and the pause signal. In the absence of the pause signal 304, the sequence controller 300 activates the first encoder 3 in response to the second sync signal, and activates the second encoder 11 in response to the next second sync signal while validating output data from the data reader 16 in response to the second sync signal. In the presence of the pause signal 304, the sequence controller 300 deactivates the first encoder 3 and deactivates the second encoder 11 in response to the next second sync signal and invalidates output data from the data reader 16 in response to the second sync signal. In this manner, the use of the pause signal 304 allows for determining whether an encoding processing operation is or is not to be applied upon input data.

Third Embodiment

Figure 10:
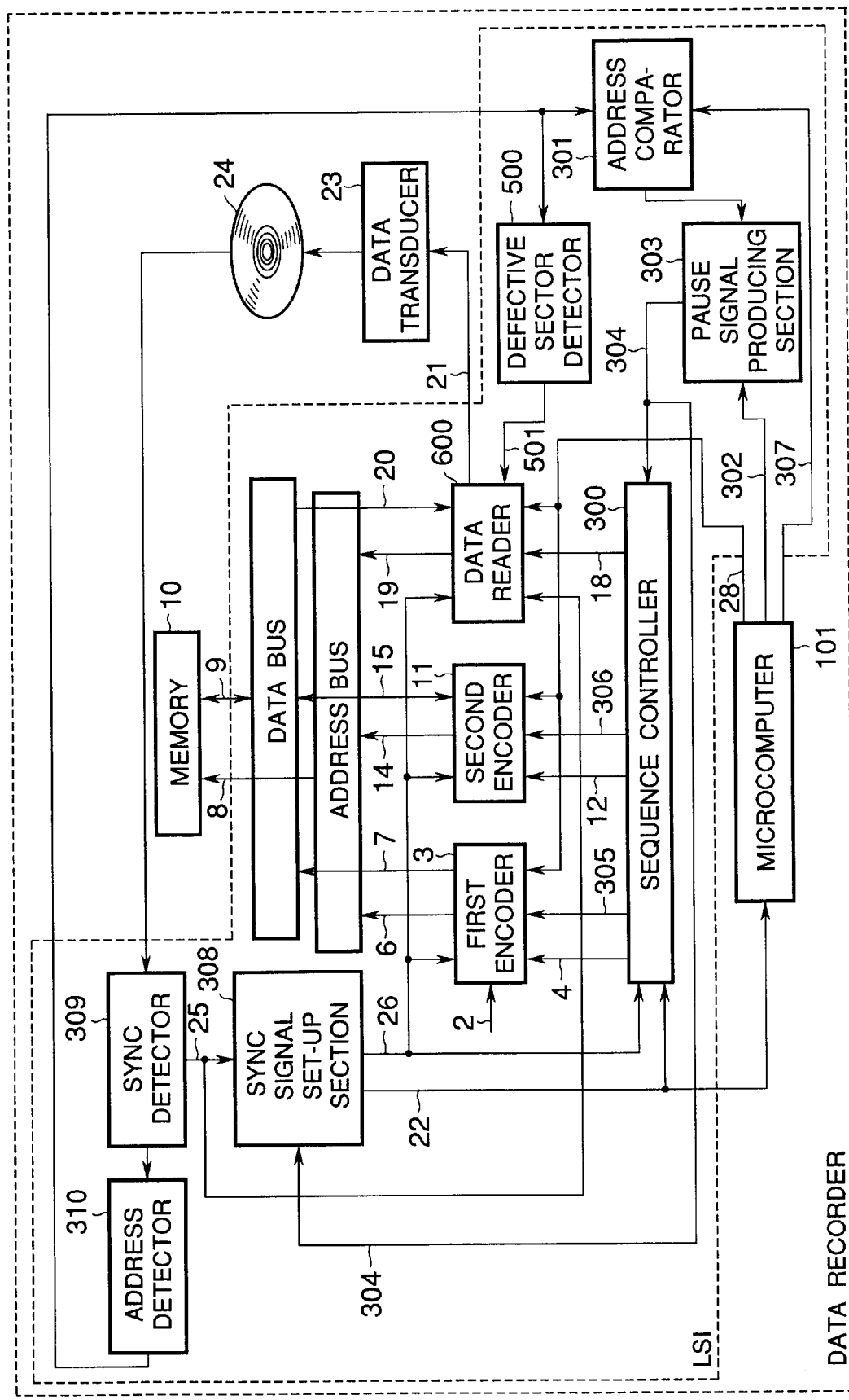
FIG. 10 is a block diagram showing a data recorder according to a third embodiment of the present invention.

FIG. 10 is a block diagram showing a data recorder according to a third embodiment of the present invention, and it is to be understood that in this Figure, parts identical to or corresponding to those shown in FIG. 7 are designated by like reference characters as before. In addition to components which are mentioned previously, the data recorder of the third embodiment includes a defective sector detector 500 which determines whether or not a sector in which data is written into is defective, from information recorded on the record medium 24 indicating a defective sector which disables a write-in operation, and delivers a repeat signal 501 of an H level when the defective sector is detected, and data reader 600 which receives the repeat signal 501 to repeat a counting operation.

Figure 11:
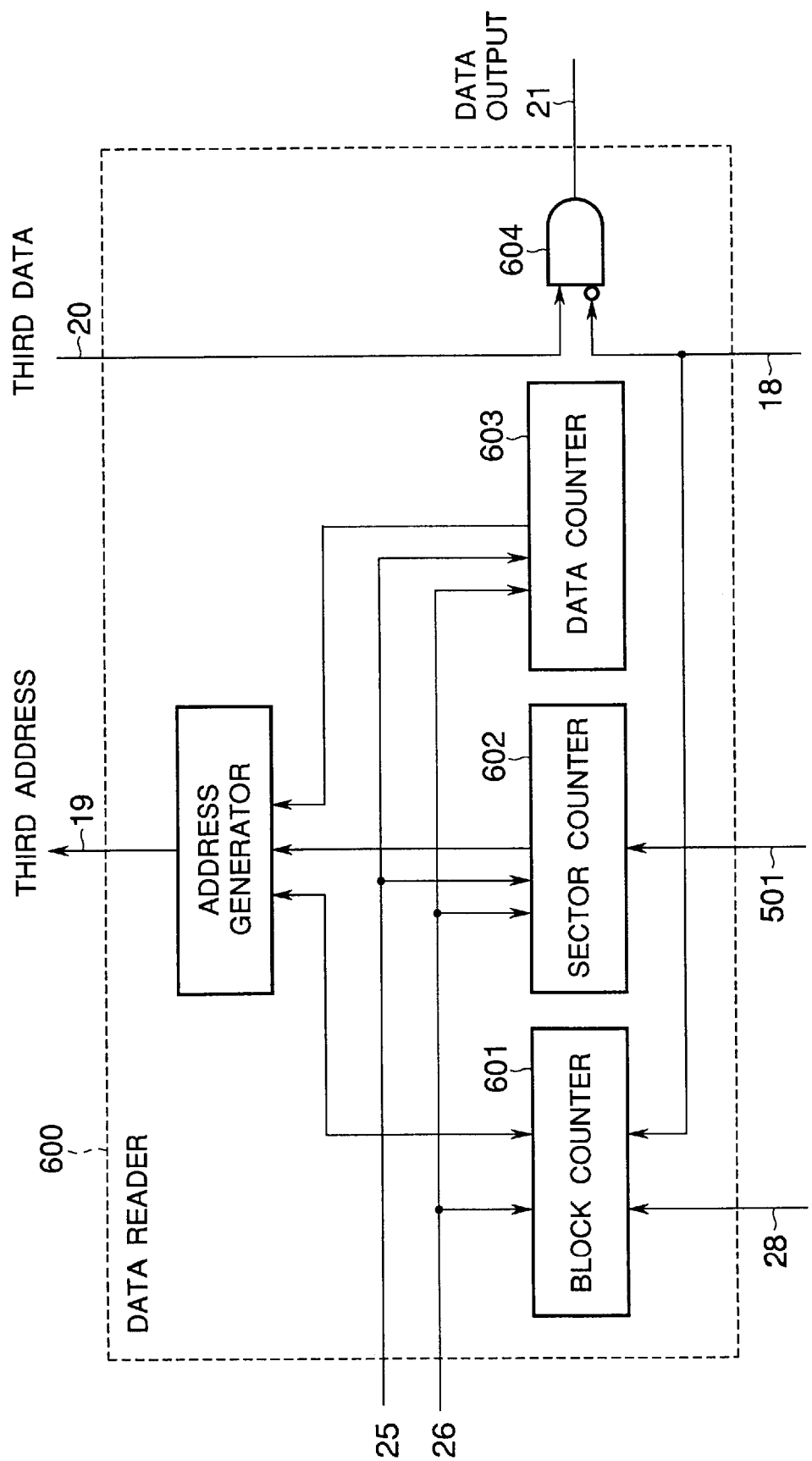
FIG. 11 is a block diagram showing a data reader of FIG. 10.

FIG. 11 is a block diagram showing the data reader 600 of FIG. 10. As shown in FIG. 11, the data reader 600 includes a block counter 601 which performs a counting operation on block basis, a sector counter 602 which counts the first sync signal 25 for sixteen sectors in one block, but which does not count up the first sync signal 25 which follows the repeat signal 501 of an H level, thus delivering a count which prevails before the input of the repeat signal 501 of an H level, and a data counter 603 which counts a number of data bytes up to 2366 in one sector.

In addition, the data reader 600 includes a data output gate 604 which delivers data 20 read from the memory 10 during the time the third enable signal 18 remains at its L level, and an address generator 605 for generating an address 19 for the memory 10 from values contained in the block counter 601, the sector counter 602 and the data counter 603. It is to be understood that the sequence controller 300 is implemented in a single IC (an LSI as a data producing circuit shown in FIG. 10) together with the first encoder 3, the second encoder 11 and the second data reader 600.

Figure 12:
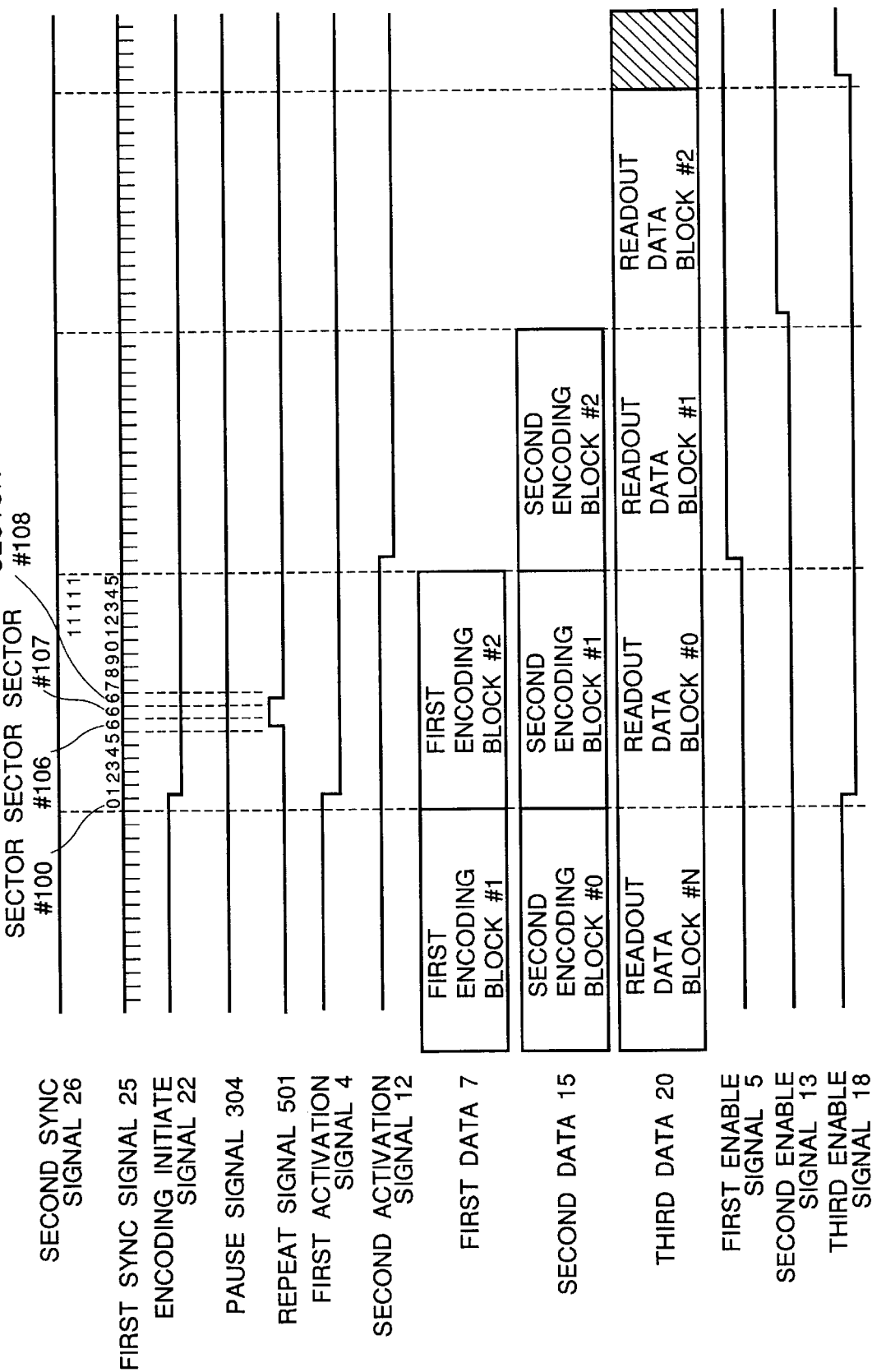
FIG. 12 is a timing chart illustrating the operation of the data recorder of FIG. 11.
Figure 13:
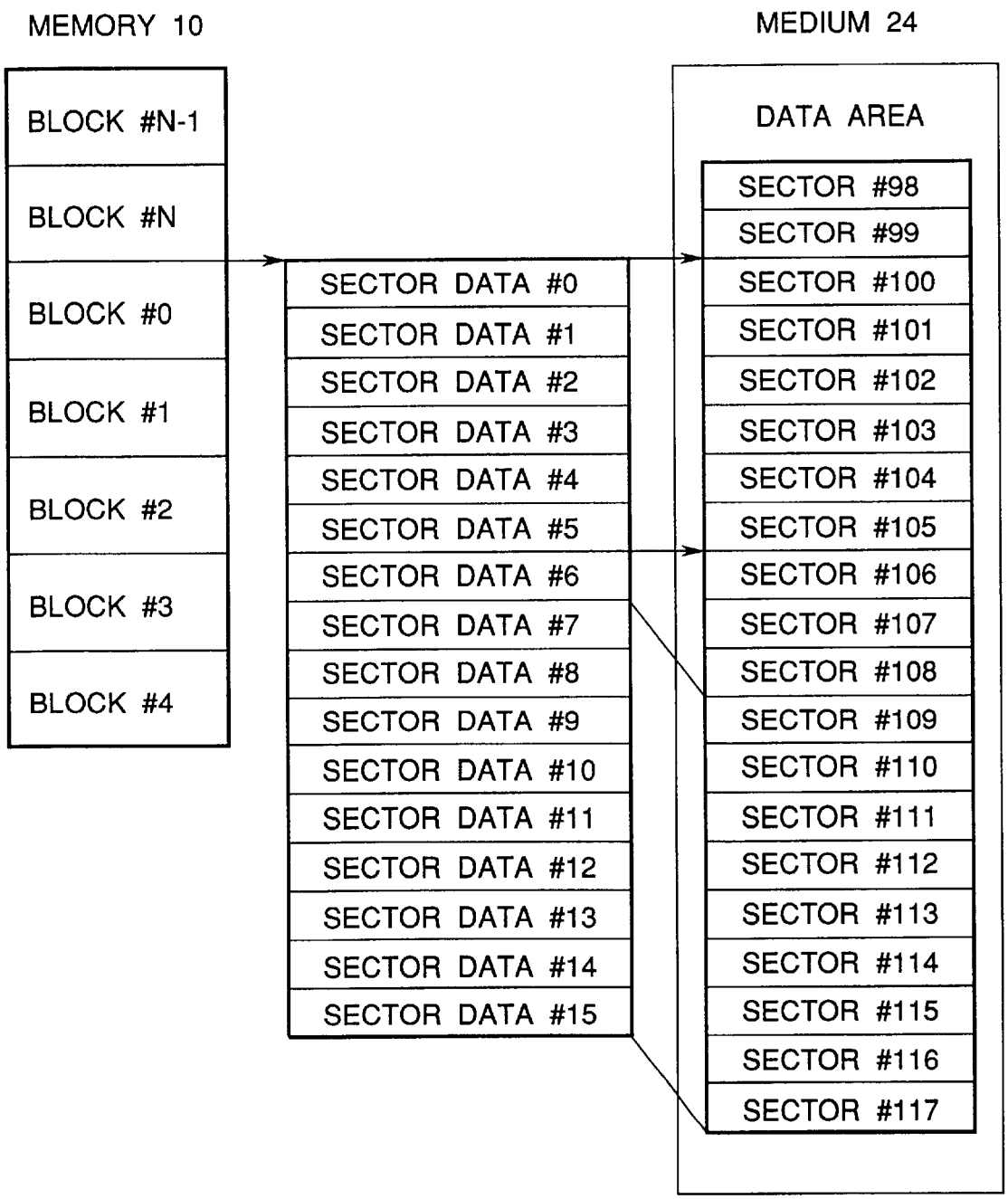
FIG. 13 is a diagram illustrating a repeated write-in operation according to the data recorder of FIG. 11.
Figure 14:
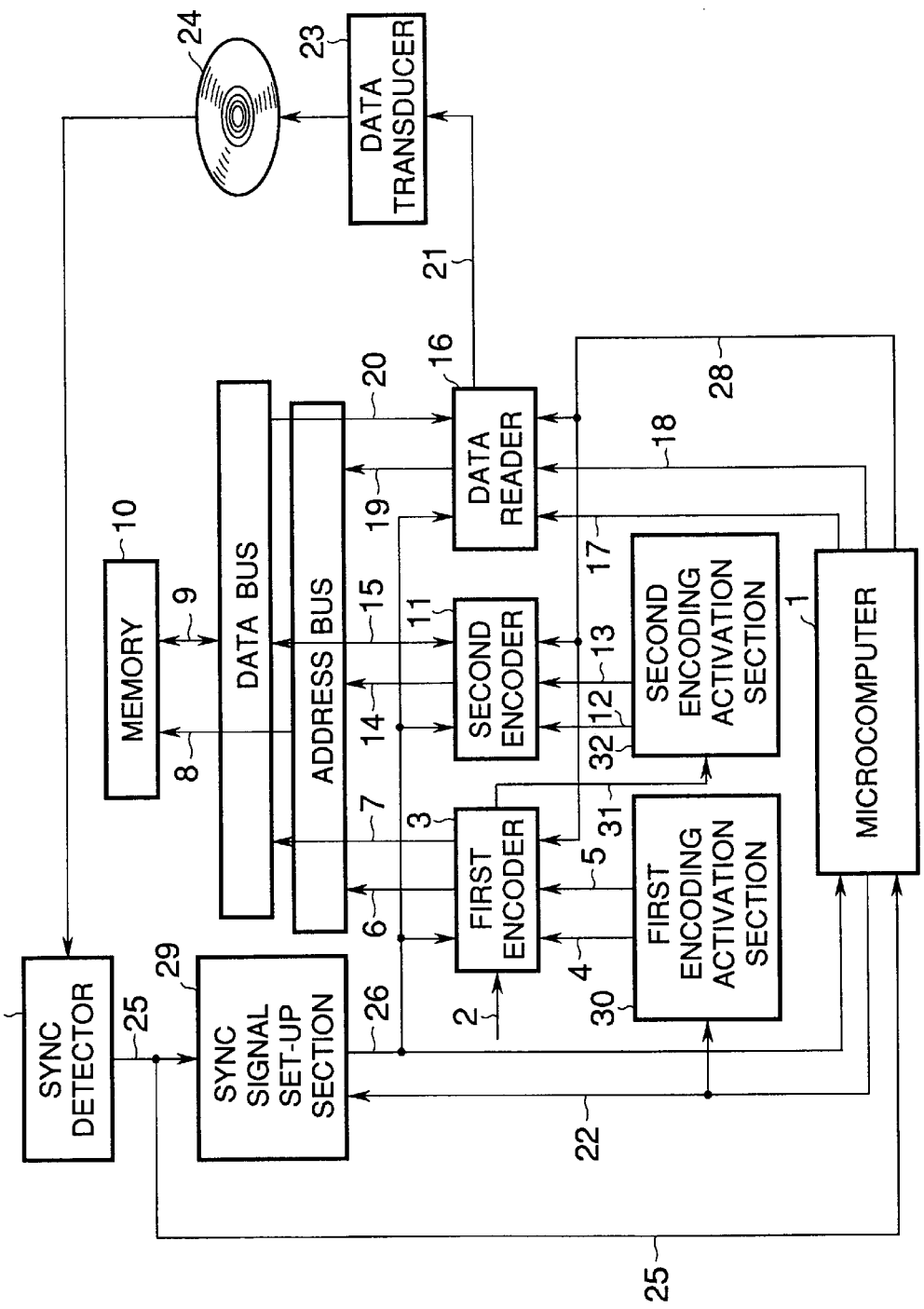
FIG. 14 is a block diagram showing a conventional data recorder.
Figure 15:
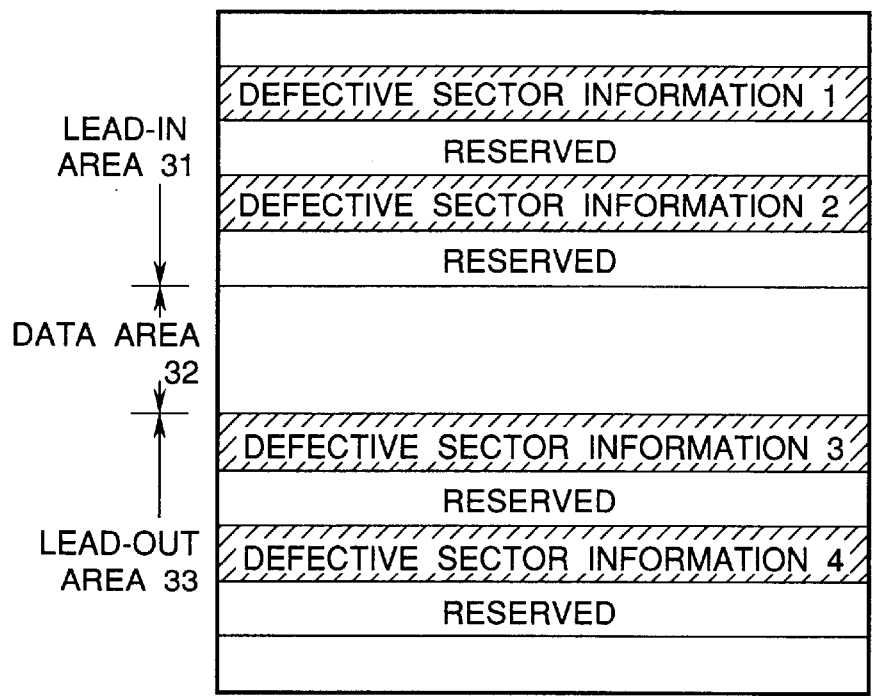
FIG. 15 is a schematic diagram showing a logical structure of a record medium.
Figure 16:
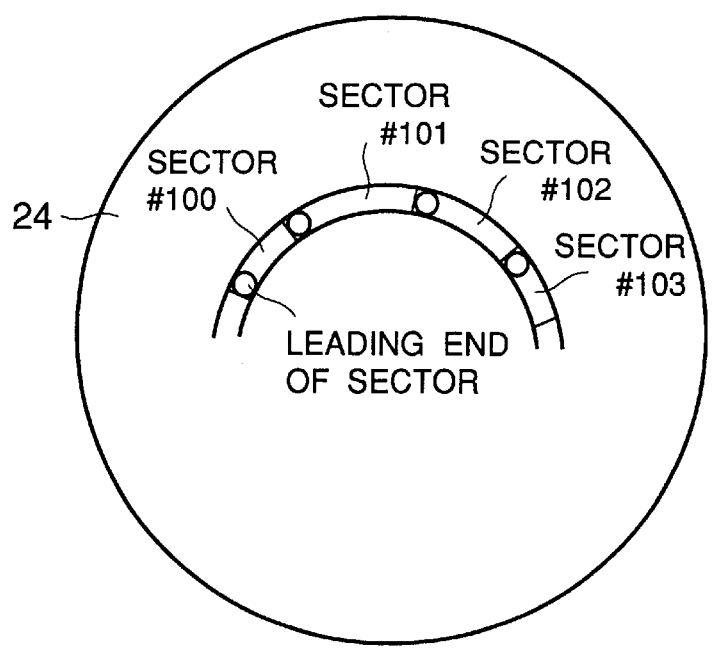
FIG. 16 is a schematic view showing a physical structure of a record medium.

FIG. 12 is a timing chart illustrating the operation of the data recorder of the third embodiment, and FIG. 13 is a chart showing a correspondence between the data structures of the memory 10 and the record medium 24 illustrating a repeated write-in operation of sector data.

The operation of the data recorder of the third embodiment will now be described with reference to FIG. 10 to FIG. 13. In the logical structure of the record medium 24 shown in FIG. 13, the position of a defective sector which disables a write-in operation into the record medium 24 is recorded in the leading area 31 also. When there is a defective sector in a write-in region, information which is to be recorded into the defective sector is recorded in an adjacent sector which continues next to the defective sector. For the purpose of present description, it is assumed that sectors #106 and #107 represent defective sectors.

Referring to FIG. 12, data which is temporarily stored in the memory 10 as a result of an encoding processing operation by the second encoder 11 is read out by the data reader 600 to be written into the record medium 24. When the write-in operation is to start with an address in the sector #100, the pause signal 304 is terminated at the sector #100, thus activating the first encoder 3, the second encoder 11 and the data reader 600.

The third enable signal 18 of an L level and the second sync signal 26 are input to the data reader 600. The block counter 601 assumes a count which is to access the block #0 in the memory 10, and this count is fed to the address generator 605. The sector counter 602 and the data counter 603 are reset by the second sync signal 26.

The data counter 603 is incremented by a number of data bytes in one sector, and restarts a counting operation from 0 in response to each input of the first sync signal 25. The count is sequentially fed to the address generator 605.

The sector counter 602 is incremented for every first sync signal 25, and counts up to sixteen sectors. However, it does not count up in response to the first sync signal 25 as long as the repeat signal 501 of an H level is input. Its count is also fed sequentially to the address generator 605.

When the recording is initiated from the sector #100 and reaches the sector #106, the defective sector detector 500 detects from the information from the lead-in area that the sector #106 is a defective sector. The defective sector detector 500 then sets the repeat signal 501 to its H level for the period of the sector #106.

The data reader 600 generates the third address 19 indicating an address in the memory 10 where the sector data #6 of the block #0 is to be read out to be recorded into the sector #106, as shown in FIG. 13. However, when the next first sync signal 25 is input, the repeat signal 501 having an H level prevents the sector counter 602 from being incremented, and accordingly, the data reader 600 generates the third address 19 indicating an address in the memory 10 where the sector data #6 of the block #0 is to be read out again. The data from the sector #6 is written into the sector #7.

The defective sector detector 500 detects from the information in the lead-in area that the sector #107 is also a defective sector, and accordingly, sets the repeat signal 501 to its H level for the period of the sector #107. As before, the data reader 600 does not access data in the sector #7 of the block #0 if the next first sync signal 25 is input, but again access data in the sector #6 again to provide data to be written into the sector #108 on the record medium 24.

The detective sector detector 500 determines from the information in the lead-in area that the sector #108 is not a defective sector, and sets the repeat signal 501 to its L level. Subsequently, there is no defective sector from the sector #109 to the sector #117, and accordingly, the sector counter 602 is incremented in response to the first sync signal 25, thus sequentially accessing sector data of the block #0 from the memory 10, and such sector data are recorded into the sector #109 to sector #117 on the record medium 24.

As described above, while the pause signal producing section 303 delivers a pause signal to the sequence controller 300, the address comparator 301 compares detected sector address information against a predetermined value, and terminates the pause signal in the event a coincidence is found between the sector address information and the predetermined value. In the presence of the pause signal, the sequence controller 300 deactivates the first encoder 3 and the second encoder 11 and invalidates data from the data reader in response to the second sync signal which immediately follows the application of the pause signal. However, when the pause signal is terminated, the sequence controller 300 activates the first encoder 3 and the second encoder 11 and validates data from the data reader 600 in response to the second sync signal which immediately follows the termination of the pause signal. On the other hand, the defective sector detector 500 detects information relating to a defective sector or sectors on the record medium, and if a recording is made to a defective sector, it poses a demand on the data reader to deliver the same sector data again. In this manner, if the presence of a detective sector is detected during a recording operation onto the record medium 24, that data can be recorded into a defect-free sector which is adjacent thereto, thus allowing an accurate recording of the entire data in the block on the record medium.

While the present invention has been shown and described above in connection with several embodiments thereof, it should be understood that a number of changes, modifications and substitutions therein are possible from the above disclosure without departing from the spirit and scope of the present invention defined by the appended claims.

What is claimed is:

1. A data recorder for recording data onto a record medium on which a sync signal is inserted at a given interval, comprising:

a sync detector for detecting the sync signal recorded on the record medium;

a system controller for triggering an initiation of a recording operation;

a sync signal set-up section for producing a leading end signal of an encoded block which is defined by a predetermined number of sectors on the basis of a result obtained by said sync detector in response to a command from said system controller;

a memory for temporarily storing a result of an encoding processing operation;

a first encoder for applying a first encoding processing operation upon input data which is to be recorded onto the record medium and for causing a result of the first encoding processing operation to be temporarily stored in said memory;

a second encoder for applying a second encoding processing operation upon the result of the first encoding processing operation which is temporarily stored in said memory and for causing a result of the second encoding processing operation to be temporarily stored again in said memory;

a data reader for reading out the result of the second encoding processing operation which is temporarily stored in said memory;

a data transducer for transducing data which is read out by said data reader into a form which can be recorded onto the record medium; and a sequence controller;

wherein, after receiving the command from said system controller which triggers an initiation of a recording operation, said sequence controller activates said first encoder in response to a leading end signal of the encoded block from said sync signal set-up section, activates said first encoder and said second encoder in response to a leading end signal of the next encoded block, and activates said first encoder, said second encoder and said data reader in response to a leading end signal of the next following encoded block; and wherein, during the absence of the command from said system controller which triggers an initiation of a recording operation, said sequence controller deactivates said first encoder in response to a leading end signal of an encoded block from said sync signal set-up section, deactivates said first encoder and said second encoder in response to a leading end signal of the next encoded block, and deactivates said first encoder, said second encoder and said data reader in response to a leading end signal of the next following encoded block.

2. The data recorder of claim 1, wherein said sequence controller comprises:

a first encoding controller, responsive to a signal from said system controller which triggers an initiation of an encoding operation and a signal from said sync signal set-up section, for producing a first activation signal which activates said first encoder and a first enable signal which causes a region in said memory which is accessed by said first encoder to be changed;

a second encoding controller for producing a second activation signal which activates said second encoder and a second enable signal which causes a region in said memory which is accessed by said second encoder to be changed; and a readout controller for producing an enable signal indicating that output data from said data reader is valid.

3. A data recorder for recording data onto a record medium on which a sync signal is inserted at a given interval, comprising:

a sync detector for detecting a sync signal recorded on the record medium;

a system controller for triggering an initiation of a recording operation;

a sync signal set-up section for producing a leading end signal of an encoded block which is defined by a predetermined number of sectors on the basis of a result obtained by said sync detector in response to a command from said system controller;

a memory for temporarily storing a result of an encoding processing operation;

a first encoder for applying a first encoding processing operation upon input data which is to be recorded onto the record medium and for causing a result of the first encoding processing operation to be temporarily stored in said memory;

a second encoder for applying a second encoding processing operation upon the result of the first encoding processing operation which is temporarily stored in said memory and for causing a result of the second encoding processing operation to be temporarily stored again in said memory;

a data reader for reading out the result of the second encoding processing operation which is temporarily stored in said memory;

a data transducer for transducing data which is read out by said data reader into a form which can be recorded onto the record medium;

a pause signal producing section for producing a pause signal on the basis of a pause set-up signal produced by said system controller and commanding a suspension of the encoding processing operation, the pause signal deactivating or activating said first encoder, said second encoder and said data reader; and a sequence controller;

wherein, after receiving the pause signal, said sequence controller deactivates said first encoder, said second encoder and said data reader independently from any status thereof in response to a leading end signal of an encoded block which is input from said sync signal set-up section;

wherein, responsive to a command from said system controller which triggers an initiation of a recording operation subsequent to termination of the pause signal or to termination of the pause signal subsequent to a command from said system controller which triggers an initiation of a recording operation, said sequence controller activates said first encoder in response to a leading end signal of an encoded block from said sync signal set-up section, activates said first encoder and said second encoder in response to a leading end signal of the next encoded block, and activates said first encoder, said second encoder and said data reader in response to the leading end signal of the next following encoded block; and wherein, during the absence of the command from said system controller which triggers an initiation of a recording operation, said sequence controller deactivates said first encoder in response to a leading end signal of an encoded block from said sync signal set-up section, deactivates said first encoder and said second encoder in response to a leading end signal of the next encoded block, and deactivates said first encoder, said second encoder and said data reader in response to a leading end signal of the next following encoded block.

4. A data recorder for recording data onto a record medium on which a sync signal and address information are inserted at a given interval, comprising:

a sync detector for detecting the sync signal which is recorded on the record medium;

a system controller for triggering an initiation of a recording operation;

a sync signal set-up section for producing a leading end signal of an encoded block which is defined by a predetermined number of sectors on the basis of a result obtained by said sync detector in response to a command from said system controller;

a memory for temporarily storing a result of an encoding processing operation;

a first encoder for applying a first encoding processing operation upon input data which is to be recorded onto the record medium and for causing a result of the first encoding processing operation to be temporarily stored in said memory;

a second encoder for applying a second encoding processing operation upon the result of the first encoding processing operation which is temporarily stored in said memory and for causing a result of the second encoding processing operation to be temporarily stored again in said memory;

a data reader for reading out the result of the second encoding processing operation which is temporarily stored in said memory;

a data transducer for transducing data which is read out by said data reader into a form which can be recorded onto the record medium;

an address detector for detecting address position information from the address information which is recorded on the record medium;

an address comparator for comparing the address obtained by the address detector against a predetermined value which is determined by said system controller;

a pause signal producing section for receiving the pause set-up signal for indicating a suspension of the encoding processing operation and producing a pause signal which deactivates said first encoder, said second encoder and said data reader when the address comparator fails to detect a coincidence between the address and the predetermined value and which deactivates or activates said first encoder, said second encoder and said data reader when the address comparator finds a coincidence between the address and the predetermined value; and a sequence controller;

wherein, after receiving the pause signal, said sequence controller deactivates said first encoder, said second encoder and said data reader independently from any status thereof in response to a leading end signal of an encoded block which is input from said sync signal set-up section;

wherein, responsive to a command from said system controller which triggers an initiation of a recording operation subsequent to termination of the pause signal or to termination of the pause signal subsequent to a command from said system controller which triggers an initiation of a recording operation, said sequence controller activates said first encoder in response to a leading end signal of an encoded block from said sync signal set-up section, activates said first encoder and said second encoder in response to a leading end signal of the next encoded block, and activates said first encoder, said second encoder and said data reader in response to the leading end signal of the next following encoded block; and wherein, during the absence of the command from said system controller which triggers an initiation of a recording operation, said sequence controller deactivates said first encoder in response to a leading end signal of an encoded block from said sync signal set-up section, deactivates said first encoder and said second encoder in response to a leading end signal of the next encoded block, and deactivates said first encoder, said second encoder and said data reader in response to a leading end signal of the next following encoded block.

5. A data recorder for recording data onto a record medium on which a sync signal, address information and sector information are inserted at a given interval, comprising:

a sync detector for detecting a sync signal which is recorded on the record medium;

a system controller for triggering an initiation of a recording operation;

a sync signal set-up section for producing a leading end signal of an encoded block which is defined by a predetermined number of sectors on the basis of a result obtained by said sync detector in response to a command from said system controller;

a memory for temporarily storing a result of an encoding processing operation;

a first encoder for applying a first encoding processing operation upon input data which is to be recorded onto the record medium and for causing a result of the first encoding processing operation to be temporarily stored in said memory;

a second encoder for applying a second encoding processing operation upon the result of the first encoding processing operation which is temporarily stored in said memory and for causing a result of the second encoding processing operation to be temporarily stored again in said memory;

a data reader for reading out the result of the second encoding processing operation which is temporarily stored in said memory;

a data transducer for transducing data which is read out by said data reader into a form which can be recorded onto the record medium;

a defective sector detector for detecting a defective sector or sectors from the sector information which is recorded on the record medium, said data reader reading out, in the event the defective sector detector detects that a sector being recorded by said data transducer is a defective sector, the same data as the data recorded in the detected defective sector from said memory for the next following recording sector and reading out successive fresh data in the absence of any defective sector detected;

an address detector for detecting address position information from the address information which is recorded on the record medium;

an address comparator for comparing an address obtained by the address detector against a predetermined value determined by said system controller;

a pause signal producing section for receiving the pause set-up signal for indicating a suspension of the encoding processing operation and producing a pause signal which deactivates said first encoder, said second encoder and said data reader when said address comparator fails to detect a coincidence between the address and the predetermined value and which deactivates or activates said first encoder, said second encoder and said data reader when said address comparator finds a coincidence between the address and the predetermined value; and a sequence controller;

wherein, after receiving the pause signal, said sequence controller deactivates said first encoder, said second encoder and said data reader independently from any status thereof in response to a leading end signal of an encoded block which is input from said sync signal set-up section;

wherein, responsive to a command from said system controller which triggers an initiation of a recording operation subsequent to termination of the pause signal or to termination of the pause signal subsequent to a command from system controller which triggers an initiation of a recording operation, said sequence controller activates said first encoder in response to a leading end signal of an encoded block from said sync signal set-up section, activates said first encoder and said second encoder in response to a leading end signal of the next encoded block, and activates said first encoder, said second encoder and said data reader in response to the leading end signal of the next following encoded block; and wherein, during the absence of the command from said system controller which triggers an initiation of a recording operation, said sequence controller deactivates said first encoder in response to a leading end signal of an encoded block from said sync signal set-up section, deactivates said first encoder and said second encoder in response to a leading end signal of the next encoded block, and deactivates said first encoder, said second encoder and said data reader in response to a leading end signal of the next following encoded block.

6. The data recorder of claim 3, wherein said sequence controller comprises:

a first encoding controller, responsive to a signal from said system controller which triggers an initiation of an encoding operation, a signal from said sync signal set-up section and the pause signal, producing a first activation signal which activates said first encoder and a first enable signal which cause a region in said memory which is accessed by said first encoder to be changed;

a second encoding controller for producing a second activation signal which activates said second encoder and a second enable signal which causes a region in said memory which is accessed by said second encoder to be changed;

a readout controller for producing an enable signal indicating that output data from said data reader is valid;

a first gate for gating an input to said first encoding controller with the pause signal;

a second gate for gating an input to said second encoding controller with the pause signal; and a third gate for gating an input to the readout controller with the pause signal.

7. A data producing circuit for producing data to be recorded onto a record medium on which a sync signal is inserted at a given interval, comprising:

a sync detector for detecting the sync signal recorded on the record medium;

a sync signal set-up section for producing a leading end signal of an encoded block which is defined by a predetermined number of sectors on the basis of a result obtained by said sync detector in response to a command from a system controller;

a first encoder for applying a first encoding processing operation upon input data which is to be recorded onto the record medium;

a second encoder for applying a second encoding processing operation upon a result of the first encoding processing operation;

a data reader for reading out a result of the second encoding processing operation; and a sequence controller;

wherein, after receiving the command from a system controller which triggers an initiation of a recording operation, said sequence controller activates said first encoder in response to a leading end signal of the encoded block from said sync signal set-up section, activates said first encoder and said second encoder in response to a leading end signal of the next encoded block, and activates said first encoder, said second encoder and said data reader in response to a leading end signal of the next following encoded block; and wherein, during the absence of the command from the system controller which triggers an initiation of a recording operation, said sequence controller deactivates said first encoder in response to a leading end signal of an encoded block from said sync signal set-up section, deactivates said first encoder and said second encoder in response to a leading end signal of the next encoded block, and deactivates said first encoder, said second encoder and said data reader in response to a leading end signal of the next following encoded block.

8. The data producing circuit of claim 7, wherein said sequence controller comprises:

a first encoding controller, responsive to a signal from said system controller which triggers an initiation of an encoding operation and a signal from said sync signal set-up section, for producing a first activation signal which activates said first encoder and a first enable signal which causes a region in said memory which is accessed by said first encoder to be changed;

a second encoding controller for producing a second activation signal which activates said second encoder and a second enable signal which causes a region in said memory which is accessed by said second encoder to be changed; and a readout controller for producing an enable signal indicating that output data from said data reader is valid.

9. A data producing circuit for producing data to be recorded onto a record medium on which a sync signal is inserted at a given interval, comprising:

a sync detector for detecting a sync signal recorded on the record medium;

a sync signal set-up section for producing a leading end signal of an encoded block which is defined by a predetermined number of sectors on the basis of a result obtained by said sync detector in response to a command from a system controller;

a first encoder for applying a first encoding processing operation upon input data which is to be recorded onto the record medium;

a second encoder for applying a second encoding processing operation upon the result of the first encoding processing operation which is temporarily stored in said memory and for causing a result of the second encoding processing operation to be temporarily stored again in said memory;

a data reader for reading out the result of the second encoding processing operation which is temporarily stored in said memory;

a pause signal producing section for producing a pause signal on the basis of a pause set-up signal produced by the system controller and commanding a suspension of the encoding processing operation, the pause signal deactivating or activating said first encoder, said second encoder and said data reader; and a sequence controller;

wherein, after receiving the pause signal, said sequence controller deactivates said first encoder, said second encoder and said data reader independently from any status thereof in response to a leading end signal of an encoded block which is input from said sync signal set-up section;

wherein, responsive to a command from the system controller which triggers an initiation of a recording operation subsequent to termination of the pause signal or to termination of the pause signal subsequent to a command from the system controller which triggers an initiation of a recording operation, said sequence controller activates said first encoder in response to a leading end signal of an encoded block from said sync signal set-up section, activates said first encoder and said second encoder in response to a leading end signal of the next encoded block, and activates said first encoder, said second encoder and said data reader in response to the leading end signal of the next following encoded block; and wherein, during the absence of the command from the system controller which triggers an initiation of a recording operation, said sequence controller deactivates said first encoder in response to a leading end signal of an encoded block from said sync signal set-up section, deactivates said first encoder and said second encoder in response to a leading end signal of the next encoded block, and deactivates said first encoder, said second encoder and said data reader in response to a leading end signal of the next following encoded block.

10. A data producing circuit for producing data to be recorded onto a record medium on which a sync signal and address information are inserted at a given interval, comprising:

a sync detector for detecting the sync signal which is recorded on the record medium;

a sync signal set-up section for producing a leading end signal of an encoded block which is defined by a predetermined number of sectors on the basis of a result obtained by said sync detector in response to a command from a system controller;

a first encoder for applying a first encoding processing operation upon input data which is to be recorded onto the record medium;

a second encoder for applying a second encoding processing operation upon a result of the first encoding processing operation;

a data reader for reading out a result of the second encoding processing operation;

an address detector for detecting address position information from the address information which is recorded on the record medium;

an address comparator for comparing the address obtained by the address detector against a predetermined value which is determined by the system controller;

a pause signal producing section for receiving the pause set-up signal for indicating a suspension of the encoding processing operation and producing a pause signal which deactivates said first encoder, said second encoder and said data reader when the address comparator fails to detect a coincidence between the address and the predetermined value and which deactivates or activates said first encoder, said second encoder and said data reader when the address comparator finds a coincidence between the address and the predetermined value; and a sequence controller;

wherein, after receiving the pause signal, said sequence controller deactivates said first encoder, said second encoder and said data reader independently from any status thereof in response to a leading end signal of an encoded block which is input from said sync signal set-up section;

wherein, responsive to a command from the system controller which triggers an initiation of a recording operation subsequent to termination of the pause signal or to termination of the pause signal subsequent to a command from the system controller which triggers an initiation of a recording operation, said sequence controller activates said first encoder in response to a leading end signal of an encoded block from said sync signal set-up section, activates said first encoder and said second encoder in response to a leading end signal of the next encoded block, and activates said first encoder, said second encoder and said data reader in response to the leading end signal of the next following encoded block; and wherein, during the absence of the command from the system controller which triggers an initiation of a recording operation, said sequence controller deactivates said first encoder in response to a leading end signal of an encoded block from said sync signal set-up section, deactivates said first encoder and said second encoder in response to a leading end signal of the next encoded block, and deactivates said first encoder, said second encoder and said data reader in response to a leading end signal of the next following encoded block.

11. A data producing circuit for producing data to be recorded onto a record medium on which a sync signal, address information and sector information are inserted at a given interval, comprising:

a sync detector for detecting a sync signal which is recorded on the record medium;

a sync signal set-up section for producing a leading end signal of an encoded block which is defined by a predetermined number of sectors on the basis of a result obtained by said sync detector in response to a command from a system controller;

a first encoder for applying a first encoding processing operation upon input data which is to be recorded onto the record medium;

a second encoder for applying a second encoding processing operation upon the result of the first encoding processing operation;

a data reader for reading out the result of the second encoding processing operation which is temporarily stored in said memory;

a defective sector detector for detecting a defective sector or sectors from the sector information which is recorded on the record medium, said data reader reading out, in the event the defective sector detector detects that a sector being recorded by said data transducer is a defective sector, the same data as the data recorded in the detected defective sector from said memory for the next following recording sector and reading out successive fresh data in the absence of any defective sector detected;

an address detector for detecting address position information from the address information which is recorded on the record medium;

an address comparator for comparing an address obtained by the address detector against a predetermined value determined by the system controller;

a pause signal producing section for receiving the pause set-up signal for indicating a suspension of the encoding processing operation and producing a pause signal which deactivates said first encoder, said second encoder and said data reader when said address comparator fails to detect a coincidence between the address and the predetermined value and which deactivates or activates said first encoder, said second encoder and said data reader when said address comparator finds a coincidence between the address and the predetermined value; and a sequence controller;

wherein, after receiving the pause signal, said sequence controller deactivates said first encoder, said second encoder and said data reader independently from any status thereof in response to a leading end signal of an encoded block which is input from said sync signal set-up section;

wherein, responsive to a command from the system controller which triggers an initiation of a recording operation subsequent to termination of the pause signal or to termination of the pause signal subsequent to a command from the system controller which triggers an initiation of a recording operation, said sequence controller activates said first encoder in response to a leading end signal of an encoded block from said sync signal set-up section, activates said first encoder and said second encoder in response to a leading end signal of the next encoded block, and activates said first encoder, said second encoder and said data reader in response to the leading end signal of the next following encoded block; and wherein, during the absence of the command from the system controller which triggers an initiation of a recording operation, said sequence controller deactivates said first encoder in response to a leading end signal of an encoded block from said sync signal set-up section, deactivates said first encoder and said second encoder in response to a leading end signal of the next encoded block, and deactivates said first encoder, said second encoder and said data reader in response to a leading end signal of the next following encoded block.

12. The data producing circuit of claim 9, wherein said sequence controller comprises:

a first encoding controller, responsive to a signal from said system controller which triggers an initiation of an encoding operation, a signal from said sync signal set-up section and the pause signal, producing a first activation signal which activates said first encoder and a first enable signal which cause a region in said memory which is accessed by said first encoder to be changed;

a second encoding controller for producing a second activation signal which activates said second encoder and a second enable signal which causes a region in said memory which is accessed by said second encoder to be changed;

a readout controller for producing an enable signal indicating that output data from said data reader is valid;

a first gate for gating an input to said first encoding controller with the pause signal;

a second gate for gating an input to said second encoding controller with the pause signal; and a third gate for gating an input to the readout controller with the pause signal.

* * * * *